US010496626B2

(12) United States Patent
Friedman et al.

(10) Patent No.: US 10,496,626 B2
(45) Date of Patent: Dec. 3, 2019

(54) DEDUPLICATION IN A HIGHLY-DISTRIBUTED SHARED TOPOLOGY WITH DIRECT-MEMORY-ACCESS CAPABLE INTERCONNECT

(71) Applicant: E8 Storage Systems Ltd., Ramat Gan (IL)

(72) Inventors: Alex Friedman, Hadera (IL); Barak Pinhas, Glvatayim (IL); Evgeny Budilovsky, Yehud (IL)

(73) Assignee: EB Storage Systems Ltd., Tel Aviv (IL)

( * ) Notice: Subject to any disclaimer, the term of this patent is extended or adjusted under 35 U.S.C. 154(b) by 572 days.

(21) Appl. No.: 15/168,055

(22) Filed: May 29, 2016

(65) Prior Publication Data
US 2016/0366226 A1 Dec. 15, 2016

Related U.S. Application Data

(60) Provisional application No. 62/173,970, filed on Jun. 11, 2015.

(51) Int. Cl.
*G06F 16/22* (2019.01)
(52) U.S. Cl.
CPC ............... *G06F 16/2255* (2019.01)
(58) Field of Classification Search
CPC ............. G06F 17/3033; G06F 16/2255; H04L 67/1097
USPC .......................................................... 707/692
See application file for complete search history.

(56) References Cited

U.S. PATENT DOCUMENTS

| 6,446,220 B1 | 9/2002 | Menon |
| 6,584,517 B1 | 6/2003 | Raza |
| 8,095,763 B2 | 1/2012 | Piszczek et al. |
| 8,510,265 B1 | 8/2013 | Boone et al. |
| 8,595,385 B1 | 11/2013 | Shapiro et al. |
| 8,725,934 B2 | 5/2014 | Batwara et al. |
| 8,812,450 B1 * | 8/2014 | Kesavan ............... G06F 3/0689 707/656 |
| 8,897,315 B1 | 11/2014 | Arad et al. |
| 9,112,890 B1 * | 8/2015 | Ori ............................ G06F 3/06 |

(Continued)

FOREIGN PATENT DOCUMENTS

WO 2013024485 A2 2/2013

OTHER PUBLICATIONS

U.S. Appl. No. 15/086,102 Office Action dated Jul. 28, 2016.

(Continued)

*Primary Examiner* — James Trujillo
*Assistant Examiner* — Jessica N Le
(74) *Attorney, Agent, or Firm* — Kligler & Associates

(57) ABSTRACT

A method for data storage includes, in a system that includes multiple servers, multiple multi-queue storage devices and at least one storage controller that communicate over a network, storing data blocks by the servers on the storage devices. A shared data structure, which is accessible to the servers using remote direct memory access and which maps hash values calculated over the data blocks to respective storage locations of the data blocks on the storage devices, is maintained. The data blocks stored on the storage device are deduplicated, by looking-up the shared data structure by the servers without executing code on a processor of the storage controller.

22 Claims, 5 Drawing Sheets

(56) References Cited

U.S. PATENT DOCUMENTS

| | | | |
|---|---|---|---|
| 9,164,689 B2 | 10/2015 | O'Brien | |
| 9,251,052 B2 | 2/2016 | Talagala et al. | |
| 9,274,720 B1 | 3/2016 | Ori | |
| 9,519,666 B2* | 12/2016 | Friedman | G06F 16/2246 |
| 2002/0103923 A1 | 8/2002 | Cherian et al. | |
| 2003/0028725 A1 | 2/2003 | Naberhuis et al. | |
| 2003/0067942 A1 | 4/2003 | Altenbernd et al. | |
| 2003/0105830 A1 | 6/2003 | Pham et al. | |
| 2003/0159083 A1* | 8/2003 | Fukuhara | H04L 67/1095 714/11 |
| 2004/0068558 A1 | 4/2004 | De Miguel | |
| 2004/0153576 A1 | 8/2004 | Hansmann et al. | |
| 2005/0050273 A1 | 3/2005 | Horn et al. | |
| 2006/0031450 A1 | 2/2006 | Unrau et al. | |
| 2006/0179197 A1 | 8/2006 | Chung et al. | |
| 2007/0050591 A1 | 3/2007 | Boyd et al. | |
| 2007/0165625 A1* | 7/2007 | Eisner | G06F 9/546 370/389 |
| 2007/0168396 A1 | 7/2007 | Adams et al. | |
| 2010/0153617 A1 | 6/2010 | Miroshnichenko et al. | |
| 2010/0250831 A1 | 9/2010 | O'Brien et al. | |
| 2011/0060887 A1 | 3/2011 | Thatcher et al. | |
| 2011/0246720 A1 | 10/2011 | Nakamura et al. | |
| 2011/0296133 A1 | 12/2011 | Flynn et al. | |
| 2012/0078978 A1* | 3/2012 | Shoolman | G06F 17/30607 707/803 |
| 2012/0079318 A1 | 3/2012 | Colgrove et al. | |
| 2012/0144110 A1 | 6/2012 | Smith | |
| 2012/0233396 A1 | 9/2012 | Flynn et al. | |
| 2013/0031234 A1 | 1/2013 | Alfano et al. | |
| 2013/0046949 A1 | 2/2013 | Colgrove et al. | |
| 2013/0138836 A1 | 5/2013 | Cohen et al. | |
| 2013/0179649 A1 | 7/2013 | Green et al. | |
| 2013/0198312 A1 | 8/2013 | Tamir et al. | |
| 2013/0275447 A1 | 10/2013 | Ben-Tsion et al. | |
| 2014/0040411 A1 | 2/2014 | Weber et al. | |
| 2014/0136808 A1 | 5/2014 | Colgrove et al. | |
| 2014/0189032 A1 | 7/2014 | Sugimoto et al. | |
| 2014/0195849 A1 | 7/2014 | Parladori et al. | |
| 2014/0245444 A1 | 8/2014 | Lutas et al. | |
| 2014/0289462 A9 | 9/2014 | Malwankar | |
| 2014/0304525 A1* | 10/2014 | Novak | H04L 63/061 713/193 |
| 2015/0012699 A1 | 1/2015 | Rizzo et al. | |
| 2015/0127923 A1 | 5/2015 | Miller et al. | |
| 2015/0212752 A1 | 7/2015 | Nemazie et al. | |
| 2015/0227602 A1* | 8/2015 | Ramu | G06F 16/27 707/634 |
| 2015/0379009 A1* | 12/2015 | Reddy | G06F 17/3033 707/747 |
| 2016/0004642 A1 | 1/2016 | Sugimoto et al. | |
| 2016/0026652 A1* | 1/2016 | Zheng | G06F 17/30097 707/692 |
| 2016/0034418 A1 | 2/2016 | Romem et al. | |
| 2016/0057224 A1 | 2/2016 | Ori | |
| 2016/0134703 A1 | 5/2016 | Ori | |
| 2016/0154834 A1* | 6/2016 | Friedman | G06F 16/2246 707/657 |
| 2016/0162209 A1 | 6/2016 | Calderone | |
| 2016/0231948 A1* | 8/2016 | Gupta | G06F 3/0611 |

OTHER PUBLICATIONS

U.S. Appl. No. 15/424,921 Office Action dated Jun. 9, 2017.
U.S. Appl. No. 15/492,000 Office Action dated Jul. 5, 2017.
International Application # PCT/IB2016/051958 Search Report dated Aug. 2, 2016.
U.S. Appl. No. 15/847,992 Office Action dated Apr. 13, 2018.
U.S. Appl. No. 15/806,355 Office Action dated Jun. 26, 2018.
Kalia et al., "Using RDMA Efficiently for Key-Value Services", Proceedings of the 2014 ACM conference on SIGCOMM, 15 pages, Aug. 17-22, 2014.
U.S. Appl. No. 14/697,653 Office Action dated Jul. 17, 2015.
NVM Express, Revision 1.2a, 209 pages, Oct. 23, 2015.
International Application # PCT/IB2015/058842 Search Report dated Feb. 28, 2016.
Rodeh, O., "B-trees, Shadowing, and Clones", ACM Transactions on Storage, vol. 3, No. 4, article 15, 27 pages, Feb. 2008.
Rodeh, O., "B-trees, Shadowing, and Clones", 2007 Linux Storage & Filesystem Workshop, San Jose, USA, 51 pages, Feb. 12-13, 2007.
Rodeh et al., "BTRFS: The Linux B-Tree Filesystem", ACM Transactions on Storage, vol. 9, No. 3, article 9, 32 pages, Aug. 2013.
Lim et al., "SILT: A memory-efficient, high-performance key-value store", Proceedings of the 23rd ACM Symposium on Operating Systems Principles, 13 pages, year 2011.
Behringer et al., "Memory Management for Concurrent RDMA: A Design for a Key-Value Store", 86 pages, Jun. 3, 2014.
Mitchell et al., "Using One-Sided RDMA Reads to Build a Fast,CPU-Efficient Key-Value Store", USENIX Annual Technical Conference, pp. 103-114, Jun. 26-28, 2013.
NVM Express, Revision 1.2, 205 pages, Nov. 3, 2014.
U.S. Appl. No. 14/697,653 Office Action dated Dec. 31, 2015.
Friedman., U.S. Appl. No. 15/015,157, filed Feb. 4, 2016.
Friedman et al., U.S. Appl. No. 15/086,102, filed Mar. 31, 2016.
U.S. Appl. No. 14/697,653 Office Action dated May 3, 2016.
U.S. Appl. No. 14/997,600 Office Action dated Jun. 17, 2016.
U.S. Appl. No. 15/015,157 Office Action dated Jun. 8, 2016.

* cited by examiner

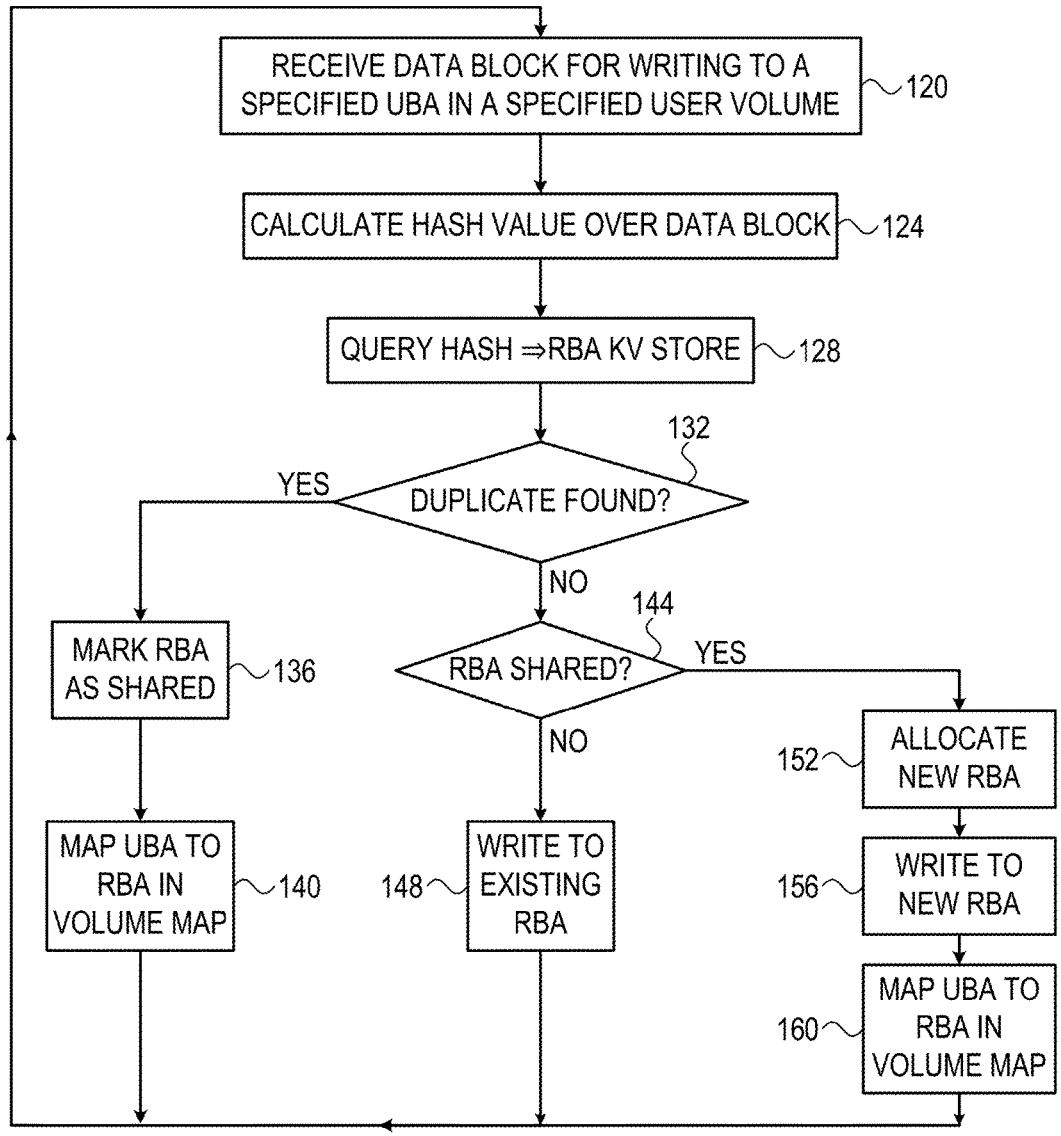

DEDUPLICATION IN A HIGHLY-DISTRIBUTED SHARED TOPOLOGY WITH DIRECT-MEMORY-ACCESS CAPABLE INTERCONNECT

CROSS-REFERENCE TO RELATED APPLICATIONS

This application claims the benefit of U.S. Provisional Patent Application 62/173,970, filed Jun. 11, 2015, whose disclosure is incorporated herein by reference.

FIELD OF THE INVENTION

The present invention relates generally to data storage, and particularly to methods and systems for distributed storage.

BACKGROUND OF THE INVENTION

Storage systems commonly store data by exposing logical volumes to users. Various algorithms for managing volumes are known in the art. For example, Rodeh describes filesystem algorithms based on B-trees, in "B-trees, Shadowing, and Clones," ACM Transactions on Storage, volume 3, no. 4, February, 2008, which is incorporated herein by reference. Rodeh et al. describe a Linux file system based on B-trees, in "BTRFS: The Linux B-Tree Filesystem," ACM Transactions on Storage, volume 9, no. 3, August, 2013, which is incorporated herein by reference.

SUMMARY OF THE INVENTION

An embodiment of the present invention that is described herein provides a method for data storage. The method includes, in a system that includes multiple servers, multiple multi-queue storage devices and at least one storage controller that communicate over a network, storing data blocks by the servers on the storage devices. A shared data structure, which is accessible to the servers using remote direct memory access and which maps hash values calculated over the data blocks to respective storage locations of the data blocks on the storage devices, is maintained. The data blocks stored on the storage device are deduplicated, by looking-up the shared data structure by the servers without executing code on a processor of the storage controller.

In an embodiment, the shared data structure includes a Key-Value (KV) store. In some embodiments, deduplicating the data blocks includes, in a given server that prepares to store a given data block, checking whether a hash value of the given data block already exists in the shared data structure, and if the hash value exists, refraining from storing the given data block on the storage devices. In an example embodiment, deduplicating the data blocks further includes, if the hash value exists, mapping a logical address of the given data block to a storage location to which the existing hash value is mapped in the shared data structure. Deduplicating the data blocks may further include, if the hash value exists, updating a shared reference count associated with the existing hash value. In an embodiment, deduplicating the data blocks further includes, if the hash value exists, updating a shared bit store to indicate that the given data block is referenced more than once.

In a disclosed embodiment, deduplicating the data blocks further includes running a background garbage-collection process that identifies and releases unreferenced data blocks. In an embodiment, the method further includes running by the storage controller a background deduplication process that deduplicates data blocks already stored on the storage devices, such that deduplication operations performed by the background deduplication process are seen atomically by the servers.

In another embodiment, deduplicating the data blocks includes choosing whether or not to deduplicate a given data block, depending on a logical volume to which the given data block belongs. In yet another embodiment, deduplicating the data blocks includes calculating the hash values by one or more Network Interface Controllers (NICs) of the servers, the storage devices or the storage controller.

There is additionally provided, in accordance with an embodiment of the present invention, a system for data storage, including at least one storage controller and multiple servers. The servers are configured to communicate over a network with the storage controller and with multiple multi-queue storage devices, to store data blocks on the storage devices, to access, using remote direct memory access, a shared data structure that maps hash values calculated over the data blocks to respective storage locations of the data blocks on the storage devices, and to deduplicate the data blocks stored on the storage device, by looking-up the shared data structure by the servers without executing code on a processor of the storage controller.

There is also provided, in accordance with an embodiment of the present invention, a server including a Network Interface Controller (NIC) and a processor. The NIC is configured to connect to a network. The processor is configured to communicate over the network with at least one storage controller and with multiple multi-queue storage devices, to store data blocks on the storage devices, to access, using remote direct memory access, a shared data structure that maps hash values calculated over the data blocks to respective storage locations of the data blocks on the storage devices, and to deduplicate the data blocks stored on the storage device, by looking-up the shared data structure by the servers without executing code on any processor of the storage controller.

The present invention will be more fully understood from the following detailed description of the embodiments thereof, taken together with the drawings in which:

BRIEF DESCRIPTION OF THE DRAWINGS

FIG. 10 is a flow chart that schematically illustrates a write process that includes in-line deduplication, in accordance with an embodiment of the present invention.

DETAILED DESCRIPTION OF EMBODIMENTS

Overview

Figure 1:
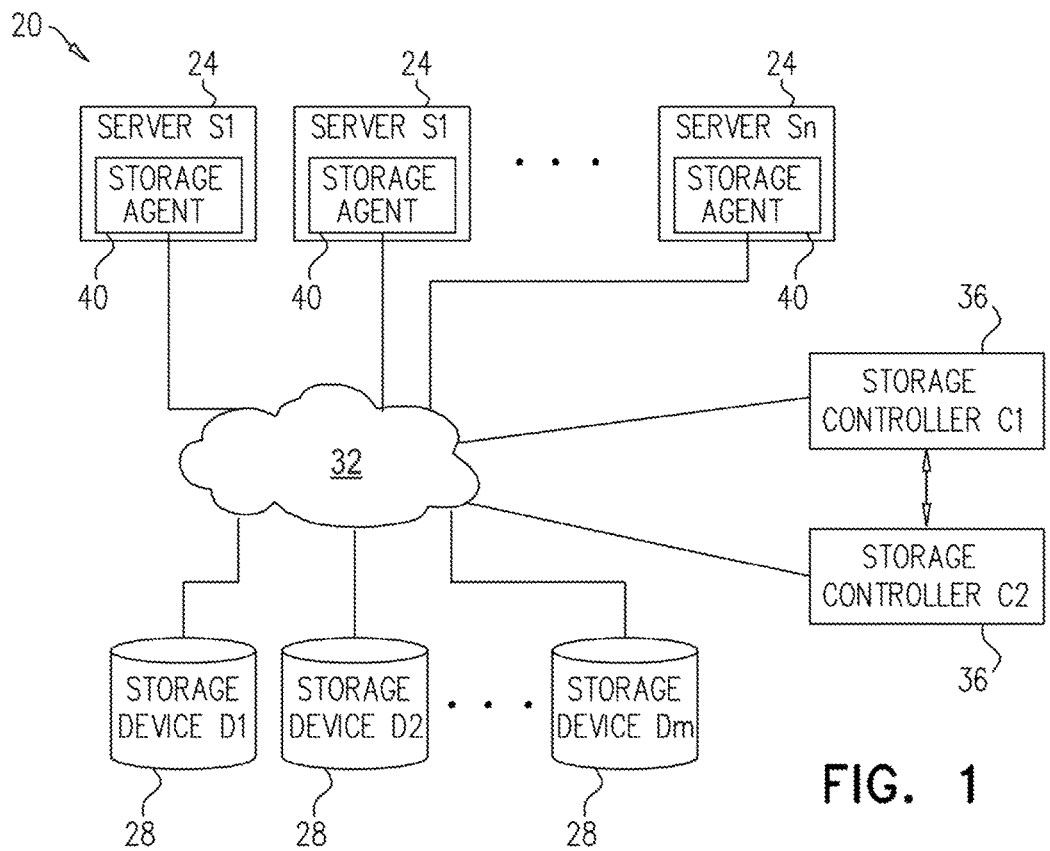
FIG. 1 is a block diagram that schematically illustrates a computing system that uses distributed data storage, in accordance with an embodiment of the present invention.

Embodiments of the present invention that are described herein provide methods and systems for data deduplication, in a system that comprises multiple servers that store data in multiple storage devices. The disclosed system further comprises one or more storage controllers, but it is designed such that the storage controllers are involved in relatively infrequent control-plane operations. Data-path storage commands, e.g., read and write commands, are exchanged directly between the servers and the storage devices.

In some embodiments, the disclosed techniques perform deduplication using a shared Key-Value (KV) store that maps hash values of data blocks to the respective storage locations of the data blocks on the storage devices. The shared KV store is typically stored in the storage controller memory, and is accessible to the servers using remote direct memory access, e.g., using a Remote Direct Memory Access (RDMA) protocol. As a result, the shared KV store can be queried and modified by the servers without triggering or otherwise executing code on the storage controller CPU.

The embodiments described herein refer mainly to Remote Direct Memory Access (RDMA) protocols, by way of example. Various variants of RDMA may be used for this purpose, e.g., Infiniband (IB), RDMA over Converged Ethernet (RoCE), Virtual Interface Architecture and internet Wide Area RDMA Protocol (iWARP). Further alternatively, the disclosed techniques can be implemented using any other form of direct memory access over a network, e.g., Direct Memory Access (DMA), various Peripheral Component Interconnect Express (PCIe) schemes, or any other suitable protocol. In the context of the present patent application and in the claims, all such protocols are referred to as "remote direct memory access." This sort of memory access enables the servers, for example, to query and update shared data structures that reside in the memory of a storage controller, without triggering or executing code on the storage controller CPU.

In some embodiments, the servers carry out in-line deduplication, as part of the process of writing data blocks to the storage devices. In some embodiments, the storage controllers may also run a background deduplication process. The amount of in-line deduplication vs. background deduplication can be traded-off as desired.

In an example in-line deduplication process, when a server prepares to write a data block, the server calculates a hash value over the data block, and queries the shared KV store with the hash value. If the hash value already exists, the server does not send the data block for storage. Instead, the server maps the logical address of the data block to the storage location (physical address) to which the hash value is mapped in the KV store.

Various techniques for managing and tracking deduplicated data blocks are described herein. Some techniques involve tracking reference counts of data blocks in shared data structures. Other techniques perform background garbage collection in order to identify and release unreferenced data blocks. All the disclosed techniques, however, adhere to the principle of using RDMA-accessible shared data structures, so as to keep the storage controller CPUs out of data-path operations.

System Description

FIG. 1 is a block diagram that schematically illustrates a computing system 20, in accordance with an embodiment of the present invention. System 20 may comprise, for example, a data center, a High-Performance Computing (HPC) cluster, or any other suitable system. System 20 comprises multiple servers 24 denoted S1 . . . Sn, and multiple storage devices 28 denoted D1 . . . Dm. The servers and storage devices are interconnected by a communication network 32. The system further comprises one or more storage controllers 36 that manage the storage of data in storage devices 28.

In the disclosed techniques, data-path operations such as writing and readout are performed directly between the servers and the storage devices, without having to trigger or run code on the storage controller CPUs. The storage controller CPUs are involved only in relatively rare control-path operations. Computing systems of this sort are also described, for example, in U.S. patent application Ser. Nos. 14/599,510, 14/697,653, 14/794,868, 15/015,157 and 15/086,102, which are assigned to the assignee of the present patent application and whose disclosure is incorporated herein by reference.

In the disclosed embodiments, each storage device 28 is a multi-queue storage device, e.g., an NVMe SSD. NVMe is specified, for example, in "NVM Express," Revision 1.2, Nov. 3, 2014, and revision 1.2a, Oct. 23, 2015, which are incorporated herein by reference. Each storage device 28 provides multiple server-specific queues for storage commands. In other words, a given storage device 28 queues the storage commands received from each server 24 in a separate respective server-specific queue. The storage devices typically have the freedom to queue, schedule and reorder execution of storage commands.

Storage-related functions in each server 24 are carried out by a respective storage agent 40. Agents 40 typically comprise software modules installed and running on the respective servers. In some embodiments, agent 40 in each server 24 maintains one or more respective queues per storage device 28, corresponding to the respective server-specific queues of the storage devices. (For example, in a server that comprises multiple CPU cores, agent 40 may maintain a respective queue per storage device per CPU core, or per storage device per group of CPU cores.) Agents 40 and storage devices 28 are permitted to reorder storage commands in the queues. The queues in a given agent 40 typically have no visibility outside the context of the respective server. The functions of agents 40, and their interaction with storage devices 28 and storage controllers 36, are described in detail below.

Servers 24 may comprise any suitable computing platforms that run any suitable applications. In the present context, the term "server" includes both physical servers and virtual servers. For example, a virtual server may be implemented using a Virtual Machine (VM) that is hosted in some physical computer. Thus, in some embodiments multiple virtual servers may run in a single physical computer. Storage controllers 36, too, may be physical or virtual. In an example embodiment, the storage controllers may be implemented as software modules that run on one or more physical servers 24.

Storage devices 28 may comprise any suitable storage medium, such as, for example, Solid State Drives (SSD), Non-Volatile Random Access Memory (NVRAM) devices or Hard Disk Drives (HDDs). In an example embodiment, storage devices 28 comprise multi-queue SSDs that operate in accordance with the NVMe specification. Network 32 may operate in accordance with any suitable communication protocol, such as Ethernet or Infiniband. In some embodiments, some of the disclosed techniques can be implemented using Direct Memory Access (DMA) and/or Remote Direct Memory Access (RDMA) operations.

Generally, system 20 may comprise any suitable number of servers, storage devices and storage controllers. In the present example, the system comprises two storage controllers denoted C1 and C2, for resilience. In this embodiment, one of the storage controllers is defined as primary, while the other controller serves as hot backup and can replace the primary storage controller in case of failure. Alternatively, however, both controllers may be active at the same time, or they may be arranged in any other suitable protected configuration.

In the embodiments described herein, the assumption is that any server 24 is able to communicate with any storage device 28, but there is no need for the servers to communicate with one another. Storage controllers 36 are assumed to be able to communicate with all servers 24 and storage devices 28, as well as with one another.

In some embodiments, although not necessarily, servers 24 are able to access the memories of storage controllers 36 directly using RDMA, e.g., for sharing data structures managed by the storage controllers. Such direct memory access reduces the load on the storage controller CPUs.

In some embodiments, the system 20 comprises an NVRAM cache (not shown in the figure) that is used for caching data blocks en-route to storage devices 28. In these embodiments, servers 24 accumulate stripes of data blocks in the NVRAM cache, using some redundant storage scheme, and eventually destage the stripes to the storage devices. Techniques of this sort are described, for example, in U.S. patent application Ser. Nos. 15/015,157 and 15/086,102, cited above.

The embodiments described herein assume that each storage device 28 provides multiple server-specific queues for storage commands, and has the freedom to queue, schedule and reorder execution of storage commands. In some embodiments, agent 40 in each server 24 maintains a respective queue per storage device, corresponding to the respective server-specific queues of the storage devices. Agents 40 and storage devices 28 are permitted to reorder storage commands in the queues. The queues in a given agent 40 have no visibility outside the context of the respective server.

The configuration of system 20 shown in FIG. 1 is an example configuration, which is chosen purely for the sake of conceptual clarity. In alternative embodiments, any other suitable system configuration can be used. The different system elements may be implemented using suitable hardware, using software, or using a combination of hardware and software elements.

For example, in an alternative embodiment, storage devices 28 may be collocated with storage controllers 36. The storage devices may even be packaged together with the storage controllers in the same mechanical enclosure. Nevertheless, the disclosed techniques enable the servers to access and manipulate user volumes by accessing the storage devices directly, without running code on the storage devices' CPUs.

Each server 24 typically comprises a suitable network interface for communicating over network 32, and a suitable processor that carries out the various server functions. Each storage controller 36 typically comprises a suitable network interface for communicating over network 32, and a suitable processor that carries out the various storage controller functions. In some embodiments, servers 24 and/or storage controllers 36 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2:
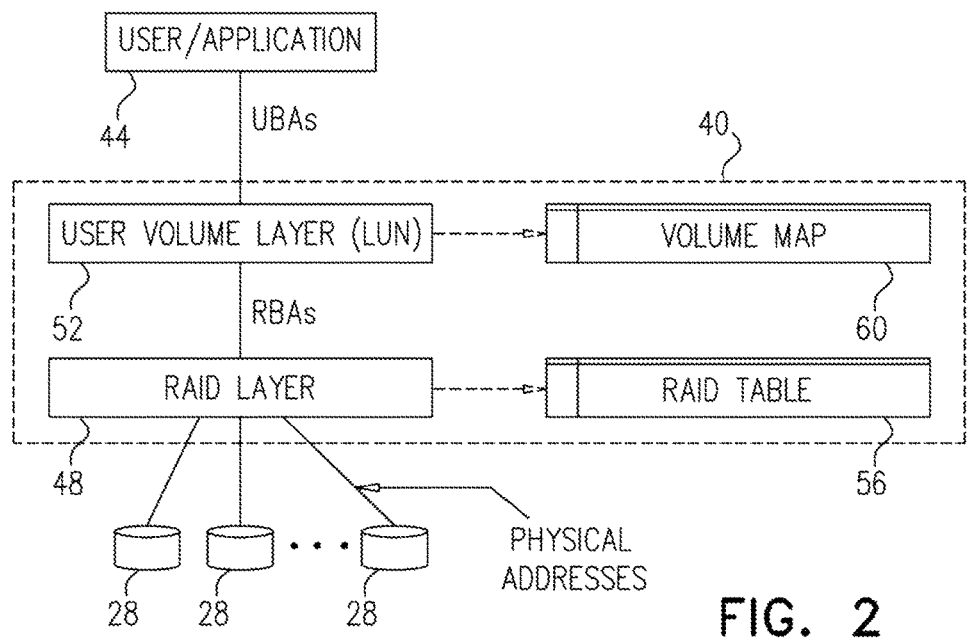
FIG. 2 is a block diagram that schematically illustrates elements of a storage agent, in accordance with an embodiment of the present invention.

FIG. 2 is a block diagram that schematically illustrates elements of storage agent 40, in accordance with an embodiment of the present invention. A respective storage agent of this sort typically runs on each server and performs storage-related functions for user applications 44 running on the server. As noted above, servers 24 may comprise physical and/or virtual servers. Thus, a certain physical computer may run multiple virtual servers 24, each having its own respective storage agent 40.

In the disclosed embodiments, each storage agent 40 comprises a Redundant Array of Independent Disks (RAID) layer 48 and a user-volume layer 52. RAID layer 48 carries out a redundant storage scheme over storage devices 28, including handling storage resiliency, detection of storage device failures, rebuilding of failed storage devices and rebalancing of data in case of maintenance or other evacuation of a storage device. RAID layer 48 also typically stripes data across multiple storage devices 28 for improving storage performance.

In the present example, RAID layer 48 implements a RAID-10 scheme, i.e., replicates and stores two copies of each data item on two different storage devices 28. One of the two copies is defined as primary and the other as secondary. The primary copy is used for readout as long as it is available. If the primary copy is unavailable, for example due to storage-device failure, the RAID layer reverts to read the secondary copy. Alternatively, however, RAID layer 48 may implement any other suitable redundant storage scheme.

RAID layer 48 accesses storage devices 28 using physical addressing. In other words, RAID layer 48 exchanges with storage devices 28 read and write commands, as well as responses and retrieved data, which directly specify physical addresses (physical storage locations) on the storage devices. In this embodiment, all physical-to-logical address translations are performed in agents 40 in the servers, and none in the storage devices.

The RAID layer maps between physical addresses and Logical Volumes (LVs) to be used by user-volume layer 52. Each LV is mapped to two or more physical-address ranges on two or more different storage devices. The two or more ranges are used for storing the replicated copies of the LV data as part of the redundant storage scheme. The addressed used for addressing the LVs (addresses in the contiguous address space exposed by the RAID layer) are referred to herein as RAID Block Addresses (RBAs). An allocated contiguous range in the RBA address space is referred to herein as a block range.

The redundant storage scheme (e.g., RAID) is thus hidden from user-volume layer 52. Layer 52 views the storage medium as a set of guaranteed-storage LVs. User-volume layer 52 is typically unaware of storage device failure, recovery, maintenance and rebuilding, which are handled transparently by RAID layer 48. (Nevertheless, some optimizations may benefit from such awareness by layer 52. For example, there is no need to rebuild unallocated storage space.)

User-volume layer 52 provides storage resources to applications 44 by exposing user volumes that are identified by respective Logical Unit Numbers (LUNs). The addresses used by the servers in addressing the user volumes are referred to herein as User Block Addresses (UBAs). An allocated contiguous range in the UBA address space is referred to as an extent. An extent typically comprises a pointer to a block range. The terms "user volume," "LUN" and "UBA" are used interchangeably herein. In other words, a user application 44 views the storage system as a collection of user volumes, and issues storage commands having user-volume addresses.

Storage agent 40 translates between the different address spaces using a RAID table 56 and a volume map 60. RAID table 56 holds the translation between LV addresses (RBAs) and physical addresses, and volume map 60 holds the translation between user-volume addresses (UBAs) and LV addresses (RBAs). Nevertheless, in the context of the present patent application and in the claims, RBAs are also sometimes referred to as physical addresses. In the description that follows, the basic storage unit in the RBA space is a RAID page, e.g., a 512B, 4 KB or 32 KB page, for example. The terms "page" and "block" are used interchangeably herein.

Typically, any server 24 may attach to any user volume. A given user volume may have multiple servers attached thereto. In some embodiments, storage controllers 36 define and maintain a global volume map that specifies all user volumes in system 20. Volume map in each storage agent 40 comprises a locally-cached copy of at least part of the global volume map. In agent 40 of a given server, volume map 60 holds at least the mapping of the user volumes to which this server is attached.

Volume Management Data Structures

In some embodiments, volume map 60 is implemented in system 20 using a reference-counted Copy-On-Write B-tree, referred to herein as a volume tree. The volume tree supports mechanisms such as thin provisioning, clones and snapshots. These mechanisms and the data structures that support them are explained in detail below.

Thin provisioning means that physical memory (in the RBA address space) is allocated to a user volume only for addresses (in the UBA address space) that are actually accessed. A reference count assigned to certain data or data structure refers to the number of entities (e.g., user volumes) accessing it. A clone or snapshot is a copy of a user volume that is created at a certain point in time. In the context of the present patent application and in the claims, the term "clone" refers to both writable and non-writable copies of user volumes. The disclosed techniques are applicable in a similar manner to any suitable types of copies of user volumes, including writable and non-writable clones and snapshots.

Repeated cloning operations create a family of user volumes that are referred to herein as a volume dynasty, which can be represented by a volume dynasty tree. The volumes in a given dynasty typically share a large number of common volume-tree nodes and extents, at least initially.

Figure 3:
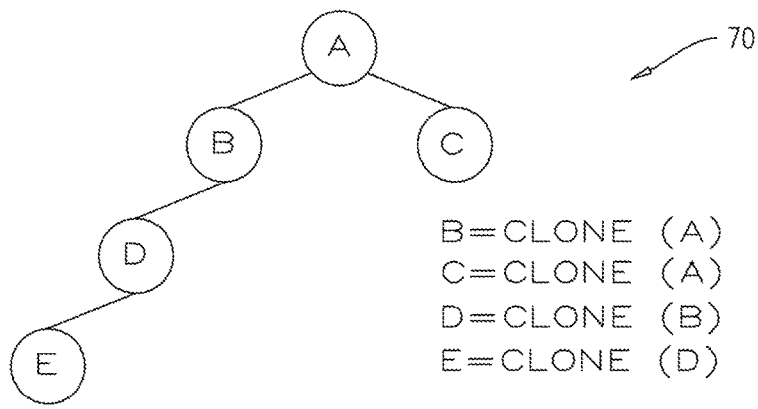
FIG. 3 is a diagram that schematically illustrates a volume dynasty tree, in accordance with an embodiment of the present invention.

FIG. 3 is a diagram that schematically illustrates a volume dynasty tree 70 managed by storage controllers 36, in accordance with an embodiment of the present invention. The parent-child hierarchy in tree 70 is created by cloning operations, i.e., a child node is a clone of its parent. In the present example, volume B is a clone of volume A, volume C is also a clone of volume A, volume D is a clone of volume B, and volume E is a clone of volume D.

Each node in dynasty tree 70 (representing a respective volume) typically comprises the following structure:

```
struct volume_dynasty_entry {
    vol_id_t volume_id;  // Unique ID of the volume, by
which the root can be found.
    u64     backref_cnt;  // Number  of  back-references
pointing to this node.
    u32 flags; // e.g., deleted
} _atribute_((packed));
```

Figure 4:
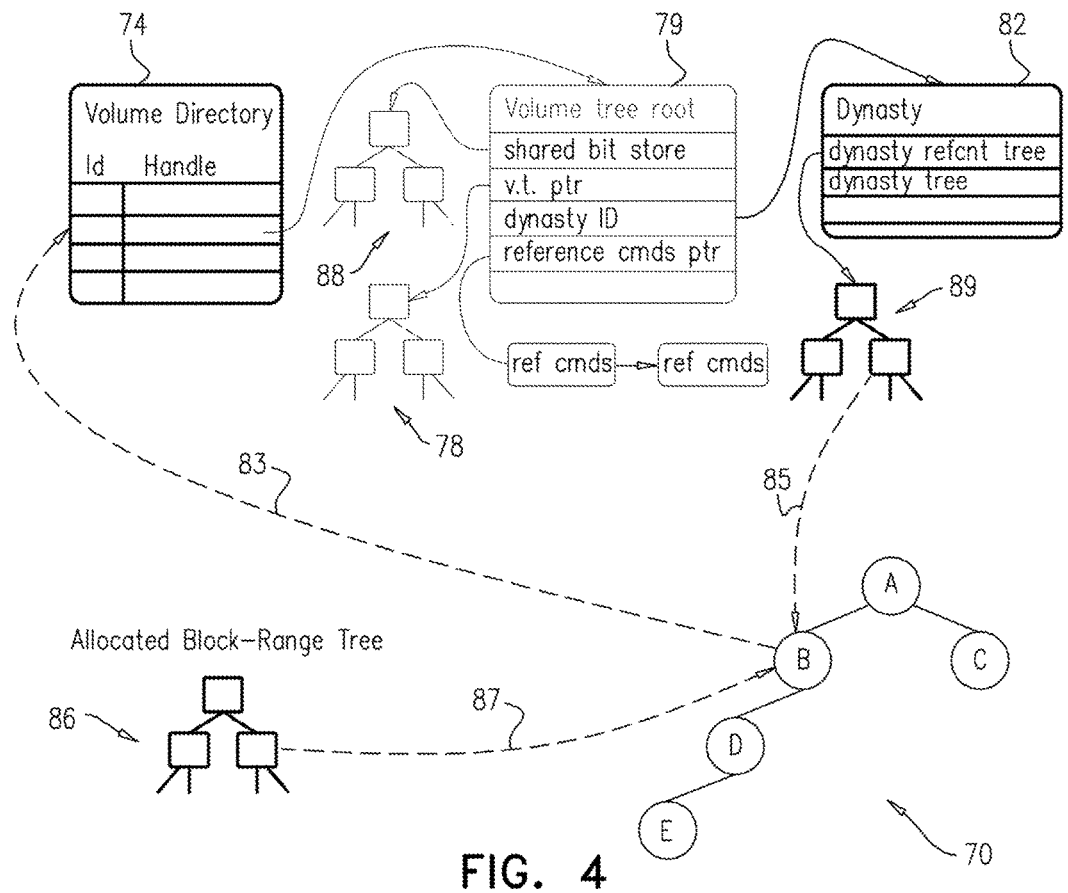
FIG. 4 is a diagram that schematically illustrates data structures used in a distributed data storage scheme, in accordance with an embodiment of the present invention.

FIG. 4 is a diagram that schematically illustrates the main data structures used by storage controllers 36 for representation and management of volumes in system 20, in accordance with an embodiment of the present invention. Elements shown in thin lines are shared between storage controllers 36 and agents 40 of servers 24, e.g., using RDMA offload. Solid arrows between data structures represent forward references (from UBA space to RBA space), whereas dashed arrows between data structures represent back-references (from RBA space back to UBA space).

In some embodiments, the data structures in system 20 comprise at least a volume directory 74, zero or more dynasty data structures 82 (one per dynasty, corresponding to a respective dynasty volume tree 70), one or more volume trees 78 (one per user volume) having respective roots 79, and an allocated block-range tree 86.

In an embodiment, each volume tree root 79 points to a shared bit store 88, a data structure that indicates which of the nodes and extents of the volume tree is shared with other volume trees (e.g., clones). Volume tree 78 and shared bit store 88 are shared between controllers 36 and servers 24. A local cache of these data structures may optionally be stored on the servers.

Each volume tree 78 is typically stored redundantly in the Random Access Memory (RAM) of both storage controllers C1 and C2. In the present example, for the sake of clarity, it is assumed that one of the storage controllers receives all requests for a given volume, and transactionally replicates the state to its peer controller.

Volume tree 78 is implemented using a Copy-On-Write B-tree. Cloning operations using such a representation is described further below. The leaves of volume tree 78 represent extents (i.e., contiguous block allocations in the UBA space). (In the context of the present patent application and in the claims, the term "node" refers to the elements in all tree levels, including leaves, middle nodes and root.)

Nodes in volume tree 78 are lazily reference-counted to allow for node-sharing between several volume trees, e.g., for implementing volume cloning and releasing unused nodes. The reference counters themselves are not necessarily stored in volume tree 78 itself. In the present example the reference counters are stored in a separate data structure referred to as a dynasty refcnt tree 89. A server 24 that maps a given user volume may optionally cache volume tree 78 of this volume, or parts thereof.

The main function of volume tree 78 is to enable an agent 40 in a server 24 to translate a UBA into the corresponding RBA, in order to access data stored in the volume. In the present example, volume tree 78 is keyed by a volume tree key structure, which specifies allocated extents in the user address space (UBA):

```
struct volume_tree_key {
    u64 user_block_address;
    u32 size_in_blocks;
} _atribute_((packed));
```

A UBA is matched within a specific volume tree key if UBA∈[key.user_block_address, key.user_block_address+ key.size_in_blocks). For each key, volume tree 78 comprises a 64-bit RBA.

In some embodiments, shared bit store 88 comprises a respective "shared bit" flag for each node of volume tree 78, including inner nodes and extents (leaves). This flag is set to "1" for inner nodes whose reference count is two or higher in volume dynasty refcnt tree 89. The flag is also set to "1" for leaves (extents) whose reference count is two or higher in volume allocated block-range tree 86. Using this implementation, shared bit store 88 provides servers 24 with sufficient information for deciding whether a node or an extent in volume tree 78 needs to be copied on write. When sharing the shared bit store among controllers 36 and servers 24, there is no need to share volume dynasty refcnt tree 89 and allocated block-range tree 86. In various embodiments, shared bit store 88 may be implemented as a tree, as a flat table indexed by node_id, or in any other suitable manner.

Volume directory 74 is typically implemented as a flat key-value store that maps volume_id's to volume tree roots 79. Such a data structure may be implemented, for example, as a flat array of 64-bit pointers to volume tree roots 79, with the array index serving as a volume_id. Servers 24 can modify entries in volume directory 74, for example, using atomic RDMA operations, along with any other persistent volume-specific information.

In the embodiment of FIG. 1, allocated block-range tree 86 specifies the block ranges (in RBA space) that were allocated to user volumes. An allocated block structure specifies a contiguous allocated block range in the RBA space, and serves as a key for accessing allocated block-range tree 86. The allocated block range structure is the value stored in the tree. Thus, accessing tree 86 comprises querying the tree with an RBA range (serving as key), and obtaining the allocated block range structure in return.

```
struct allocated_block_range {
    u64 raid_block_address;
    u32 size_in_blocks;
    u32 refcount;
} _atribute_((packed));
```

Each block (in RBA space) in tree 86 comprises a reference count specifying the number of user extents (in UBA space) referencing it. Cloning a volume does not increase the reference count of its extents due to lazy refcnt management. However, when a leaf in volume tree 78 is copied-on-write such that two leaves point to the same RAID block-ranges, the reference count of those RAID block-ranges is incremented.

Note that a user volume may refer to only a portion of an allocated block-range, and not to the entire block-range. Consider, for example, a scenario in which a volume is cloned and the parent volume receives a 4 KB write request in the middle of a 1 MB allocated block-range. To accommodate this write request, the user 1 MB extent is split into two, and a new 4 KB extent is allocated and placed in the middle. The 1 MB block-range is now referenced by two user extents smaller than 1 MB, and by the third original user extent. Thus, the reference count of this 1 MB block-range is now three.

In an embodiment, allocated block-range tree 86 also assists in optimizing RAID rebuilds (e.g., following storage device failure), by providing an interface for querying which areas of the RAID address space are in fact in use.

In some embodiments, controllers 36 define allocated-block-range back-references 87, which point from block ranges in tree 86 to volume dynasty entries in dynasty tree 70. A given back-reference 87 enable the storage controllers to find all volume trees 78 that reference this allocated-block-range.

When a back-reference 87 is created, the dynasty entry backref_cnt member of the relevant volume is incremented. When a back-reference 87 is deleted, the backref_cnt member is decremented. A volume delete operation on a volume that has a positive backref_cnt in its volume_dynasty_entry is marked as deleted (e.g., using flags), but not removed from dynasty tree 70. A volume delete operation on a volume that has a zero backref_cnt in its volume_dynasty-_entry, or a volume that is marked as deleted and has backref_cnt decremented to zero, is removed from the dynasty tree. All children of such a deleted node are migrated to its parent. The root of dynasty tree 70 (the entry representing the original volume from which the other volumes were cloned) is only deleted when its backref_cnt reaches zero and it has no children, thus deleting the entire dynasty.

In an alternative embodiment, the volume dynasty may be represented using an efficient data structure, such as a Red-Black (RB) tree, enabling faster lookup at run time.

Volume dynasty refcnt tree 89 stores the reference counts of all non-leaf (non-extent) nodes in all volume trees 78 of the volume dynasty, along with their respective back-references 85. Tree 89 is keyed by node_id values that uniquely identify volume-tree nodes in system 20.

In an embodiment, nodes with a reference count of one are not added to tree 89, since most nodes in the volume trees of the system are expected to have a reference count of one. Nodes with zero reference count are not added to refcnt tree 89 either, as they should be freed once their reference count reaches zero. Incrementing a reference count from one to two causes the storage controller to add both the source and target volumes as back-references 85.

Back-References Between Data Structures

In some embodiments, back-references 87 are used by controllers 36 for fast lookup of user extents from RAID block-ranges. Such fast lookup is needed, for example, for operations involving moving data, such as phasing-out of a RAID address range or defragmentation. Each back-reference 87 typically points to a user extent in a volume tree. To enable moving data from one RAID block-range to another, the back-reference should enable the storage controller to modify all volume trees 78 referencing a given RAID block-range. Upon creation, each back-reference 87 typically comprises a pointer to the entry of the appropriate volume in volume dynasty tree 70, and the user address (UBA) of the extent. Back-references 87 are typically stored in allocated block-range tree 86.

Another type of back-references, marked 85 in FIG. 4, are used for fast lookup of volume trees 78 from volume-tree nodes (which may be referenced by multiple trees in the same volume dynasty). Such fast lookup is used, for example, for paging-out a node shared among multiple volumes to non-volatile memory. Volume dynasty refcnt tree 89 typically maintains back-references 85 for each node having a reference count of two or more. Upon creation, each back-reference 85 typically comprises a pointer to the entry of the appropriate volume in volume dynasty tree 70, and the lowest key in the node.

Server-Side Metadata Usage and Manipulation

In the disclosed embodiments, agents 40 in servers 24 carry out I/O operations without triggering or running code on the storage controller CPUs. For this purpose, agents 40 are capable of reading and manipulating the shared metadata and data structures located on the controllers described herein. For example, a given agent 40 is able to translate UBAs into RBAs using volume trees 78, to allocate blocks and add new extents to thinly-provisioned volumes, and to modify volume trees 78 (e.g., to replace extents) when performing copy-on-write for cloned or de-duplicated extents. All these operations are performed by agents 40 in servers 24 autonomously, without triggering the storage controller CPUs.

Typically, for each mapped user volume, agent 40 has RDMA access to the following data structures and generation numbers:

- Volume tree handle structure in volume directory 74, typically using 64-bit RDMA read/atomic test and set access.
- Volume tree 78, typically using RDMA read access.
- Pre-allocated (on both storage controllers 36, per server 24) volume-tree nodes, usually using RDMA read/write access.

In addition, each agent 40 typically has a pool of pre-allocated block ranges, so that the agent is able to autonomously allocate new extents to user volumes. Any suitable pre-allocation policy can be used for this purpose. It is typically the responsibility of agent 40 to maintain a sufficient number of block ranges and volume-tree nodes by receiving prior allocations from the controllers in a non-I/O context.

UBA-to-RBA Translation

Volume tree 78, or at least a portion thereof, is typically cached locally on each server 24 mapping the respective user volume. To perform UBA-to-RBA translation, e.g., as part of a read or write operation, agent 40 typically looks-up the cached volume tree. If a certain portion of the volume tree is needed for the lookup but is not cached locally at the server, agent 40 typically retrieves the missing portion from storage controller 36.

The retrieval of a missing volume-tree portion typically begins by reading the volume-tree handle structure using RDMA, and verifying that the correct tree generation is used (i.e., that the structure is equal to the locally cached tree). If not, the locally-cached tree is to be updated, possibly optimized using generation numbers/digests in a parallel (smaller) data structure.

In an embodiment, agent 40 reduces latency by verifying the generation number in parallel with the I/O operation itself. Such parallelization is possible when the I/O operation is non-damaging, e.g., comprises only read requests, or performed while transmitting the data to be written but before actually writing it and redoing the operation in case of inconsistency.

Volume-Tree Modification

In some cases, a write operation by a server to a user volume requires modifying volume tree 78, e.g., when a new block needs to be allocated due to thin-provisioning or copy-on-write. In an embodiment, agent 40 of the server first updates the locally-cached copy of the volume tree by applying copy-on-write to the affected nodes, including the root. B-tree nodes are proactively split or merged during addition or removal.

Agent 40 then writes the new nodes using RDMA to pre-allocated nodes on both storage controllers 36. The agent then issues an atomic test-and-set RDMA command, so as to commit the updated volume tree by atomically replacing the volume tree handle structure (on both controllers, one by one, starting at the master controller).

If the test-and-set command fails, the locally-cached copy of the volume tree is updated and the operation is retried. Such contention is typically rare. This sort of atomic test-and-set of the root can also be used in a centralized manner to increase B-tree operation parallelism. The protocol can be network optimized by using RDMA commands such as accelerated memcpy to copy an old node to a new location on the controller without transferring the entire 4 KB of data over the network.

A possible "write hole" problem could arise if the server crashes after performing the test-and-set operation on the first controller, but before updating the secondary controller. In an example embodiment that solves this issue, each controller 36 periodically scrubs the volume tree handles of all volumes it masters, by comparing them to the corresponding handles on the secondary controller. In case of a mismatch, the comparison may be retried several times, and if the mismatch is persistent, it is fixed. If a server detects a mismatch before it is resolved by the controllers, the server may request the controller to fix the discrepancy in-band. Such scrubbing is typically triggered immediately for all volumes mapped (with write access) by a server that is detected as crashed.

Reference Counting and Copy-On-Write

Modifying the volume tree may involve updating reference counters and/or back-references of nodes and/or extents. As the data structures holding this information are centralized, controllers 36 should be involved. In some embodiments, in order to keep the controller CPUs out of this process, the server writes (using RDMA) a sequential list of commands requesting controllers 36 to lazily perform these operations on its behalf. In this context, "lazily" means that the operations will be performed by the controllers outside the I/O context.

In the example of FIG. 4, a pointer (denoted "reference cmds ptr") to a linked list of such sets of commands is stored in volume tree root 79. A server may add a pointer to its commands to root 79 before committing it by the atomic test-and-set RDMA operation, potentially chaining the command sets of previous servers.

The master controller for each volume periodically checks each root 79 and performs the reference count commands. Note that volume-tree nodes may be copied, split and/or merged, and therefore the command set should allow for such manipulation of the data structures by controllers 36. Source and target volume_ids, and the lowest UBA in a node, can be used by controllers 36 to establish back-references to nodes in volume dynasty refcnt tree 89.

In an example embodiment, a non-exhaustive list of commands may comprise:

inc_node_ref_cnt(node_id,src_volume_id, target_volume_id, lowest_uba_in_node)
    dec_node_ref_cnt(node_id, volume_id, lowest_uba_in_node)
    inc_block_range_ref_cnt(rba,volume_id,uba)
    dec_block_range_ref_cnt(rba,volume_id,uba)
    add_new_node(node_id, volume_id, lowest_uba_in_node)
    add_new_block_range(rba,volume_id,uba)

To reduce latency, the metadata operations performed by servers 24 may be performed in parallel with transferring the actual write data to the controller and writing to non-volatile memory.

Typically, a node or extent of the volume tree should be copied-on-write if its shared bit in shared bit store 88 is set. As will be explained below, the shared bit is typically set by controller 36 during cloning and de-duplication operations. The shared bit may be reset when controller processes the reference count command set lists.

The main purpose of the shared bit is to ensure that data is copied-on-write when appropriate. However, since reference counts and the shared bit are not updated at I/O time, there may be rare occasions where nodes are copied-on-write needlessly.

For example, let A be a volume tree and B=clone(A). Consider a write operation that arrives in one of the extents of A. As a result, a new extent is allocated for the write, and the relevant nodes/extents are copied-on-write and modified. At this point, a second write arrives to the same location, but this time to volume B. Since this location is no longer shared, the second write may be simply performed in-place. However, if the reference commands were not yet processed by the controller, an unneeded extent will be allocated and the relevant nodes copied-on-write needlessly. The unused nodes and extents may be released once the controller processes the relevant decrement reference commands, which will reduce the reference count to zero.

Volume Tree Allocation, Indexing and Paging

As explained above, volume tree 78 of a user volume is read and written collaboratively by storage controllers 36 and the various agents 40 in servers 24 that map that volume. While a volume tree may comprise nodes shared by multiple volumes, e.g., after a volume is cloned, a server usually caches only the nodes accessible from the roots of the volumes mapped by the server.

In some embodiments, each agent 40 is able to read (using RDMA, from controller 36) volume-tree nodes of volumes it maps. Agent 40 is able to write (using RDMA) nodes that have been pre-allocated to the server. Volume-tree nodes are typically pre-allocated out-of-band to servers 24, and mapped as writable to the relevant servers. It is typically the responsibility of each server 24 to ensure it has a sufficiently large pool of pre-allocated volume-tree nodes.

In some embodiments, controllers 36 are configured to page-out volume-tree nodes to underlying shared persistent storage (e.g., Flash storage). This paging-out capability enables volume map 60 to exceed the size of the controllers' power-failure-protected RAM. In an embodiment, the most significant bit of the index may be used as the present bit. Paged-out volume-tree nodes may be stored in a dedicated thinly-provisioned swap volume on the system (e.g., one swap volume per pair of storage controllers). This dedicated volume is mapped as read/write on controllers 36, and read-only on servers 24. The swap volume tree may be pinned to power-failure-protected RAM.

In an embodiment, to page-out a volume-tree node, controller 36 first writes the node content to the swap volume. In parallel, the controller looks-up all volume trees 78 that comprise the node to be swapped, e.g., by looking-up volume dynasty refcnt tree 89. Controller 36 then modifies the given volume-tree paths to point to the paged-out node (present bit cleared). The virtual page used by the node should then be unregistered from RDMA, such that a server will not be able to erroneously read it, and the underlying physical page may then be reused for other purposes. The scheme above allows volume-tree nodes to be paged-out, while keeping the controller CPUs uninvolved the I/O path. A server that needs to read a volume-tree node that has been paged out can read the node directly from the swap volume. Such a server may send hints to the controller to page-in the given node.

Additionally or alternatively, controllers 36 may be configured to page-out any other suitable data structure.

Block Storage Operations

This section describes several block storage operations that are performed by agents 40 in servers 24 and/or by storage controllers 36 using the above-described data structures.

Creation or Deletion of a Volume

Creation or deletion of a user volume typically comprises a non-I/O-path operation performed by storage controller 36. In some embodiments, a storage controller creates a new volume tree 78 by allocating and initializing an empty volume tree (a single page), adding the new tree to volume directory 74, and creating a new volume dynasty 70. The relevant metadata operations are transactionally mirrored by the other storage controller.

A storage controller may delete a volume by recursively traversing the volume tree. For each traversed node, the controller decrements the reference count (in volume dynasty refcnt tree 89). If the resulting reference count is non-zero, the controller stops downward traversal and returns up the tree. If the reference count is zero, the controller continues downward traversal in the tree, freeing nodes on the way back up the tree.

Cloning a Volume

Cloning of a user volume typically comprises a non-I/O-path operation performed by the storage controller. As explained above, user volumes are represented by B-trees that allow for quick creation of space-efficient clones that share data structures and extents. Cloned volumes have similar properties to regular volumes, e.g., allowing them to be cloned, as well.

Figure 5:
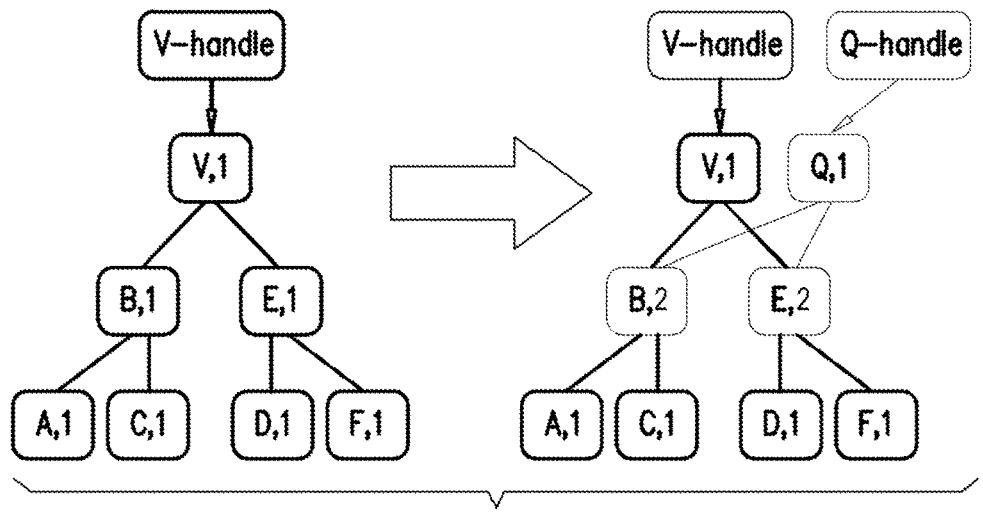
FIG. 5 is a diagram that schematically illustrates a volume cloning process, in accordance with an embodiment of the present invention.

FIG. 5 is a diagram that schematically illustrates a volume cloning process, carried out by storage controller 36, in accordance with an embodiment of the present invention.

The left-hand-side of the figure shows the volume tree of a user volume denoted V, before cloning. The right-hand-side of the figure shows the volume tree after volume V is cloned to produce a new volume denoted Q.

In the present example, nodes A, C, D and F correspond to allocated extents. Each node in the tree is marked with a respective index letter and a respective node-specific reference count. The reference counts are stored in the volume reference count tree 89.

When volume V is cloned, controller 36 shadows root 79 of volume tree 78 of volume V into a newly-allocated tree-root page Q. The controller lazily increments the reference counts of (only) the direct children of the tree root. The new volume Q is then added to volume directory 74, and to dynasty tree 70 as a child of volume V.

In an embodiment, controller 36 manages the exact point in time at which a clone is performed with respect to I/O commands. Successful completion of a clone command indicates that the clone is complete. The cloned volume may comprise some or all commands queued before the completion of the clone command. However, the cloned volume (Q) should be completely separate with respect to writes issued to the original volume (V) by servers after successful completion of the clone command.

As explained above, controller 36 sets the shared bits of volume-tree nodes during a clone operation, after lazily incrementing the reference counts of the child nodes of volume V. The shared bit change is followed by invalidation the volume-tree handle, which is checked by all servers while handling write commands. This mechanism guarantees that such servers will notice the clone operation and perform a copy-on-write of the relevant extents and tree nodes. In an embodiment, since the shared bits are not relevant for read operations, the volume tree handle may be updated such that reads will continue to flow while the tree is updated for writes.

In the example of FIG. 5, controller 36 increments the reference counts of nodes B and E, while also setting the shared bits of these nodes, and updating the volume-tree handle of volume V to force servers to update their locally-cached trees.

Extent Provisioning

Provisioning of extents typically comprises an I/O-path operation, which may be performed by either servers or by controllers 36. A new extent is typically inserted into a volume tree 78 when a server 24 writes to a UBA to which an RBA was not yet allocated. For simplicity of explanation, we first describe insertion of an extent into a volume tree whose reference counts are all one. The case of a cloned volume tree, having reference counts greater than one, is addressed further below.

In an embodiment, a server 24 traverses its locally-cached volume tree, attempting to find the leaf node in which an extent with the requested UBA range should be located. If such an extent is not found, the server allocates a new block range from its pre-allocated pool of block ranges. Due to fragmentation, it is possible that more than one block range will be needed to cover the desired UBA range. The one or more newly-allocated block ranges are then added to the volume tree as extents (leaves—one per allocated contiguous block range). While adding the extents, nodes are proactively split, merged and shadowed on the way down the tree. Once the operation is complete, the updated volume tree can be committed to both storage controllers.

Consider a scenario in which two or more servers 24 race to write to unallocated UBA ranges that overlap one another. This scenario may occur, for example, when two servers write to overlapping UBA ranges. As another example, when a large contiguous block is allocated, the servers may write to UBA ranges that do not overlap, but the two newly-created extents do collide with each other (e.g., two adjacent 4 KB UBAs with an 8 KB RBA allocation). In such a case, one of the servers will typically succeed in committing the volume tree and the other will fail and redo the operation.

Clones & Insertion of New Extents

Insertion of a new extent into a cloned volume tree typically comprises an I/O-path operation, which may be performed by servers 24 or by controllers 36. Such extent insertion is performed in response to a write to an extent that is shared between two or more volumes (i.e., an extent having a reference count greater than one).

Inserting an extent into a volume tree triggers shadowing on the path from the tree root to the relevant leaf. For each shadowed node having a reference count greater than one, the reference count of the source node is decremented and the new shadowed node is assigned a reference count of one. The reference counts of the direct children of the source node are incremented by one. For nodes having a reference count of one, the mechanism of the previous section is followed.

Figure 6:
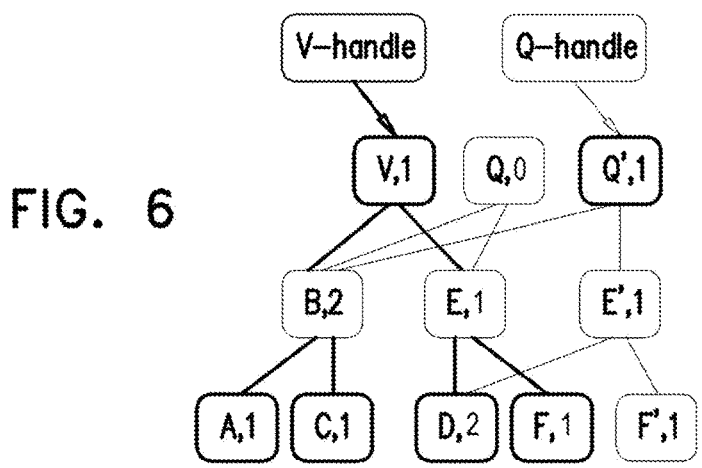
FIG. 6 is a diagram that schematically illustrates a process of adding an extent to a volume, in accordance with an embodiment of the present invention.

FIG. 6 is a diagram that schematically illustrates a process of adding an extent to a cloned volume tree, in accordance with an embodiment of the present invention. The example of FIG. 6 begins with the cloned volume tree on the right-hand-side of FIG. 5 above.

At a certain point in time, a server 24 writes to volume Q, to an extent stored in node F. The server follows by copying-on-write the entire path from the tree root to node F, i.e., nodes Q, E and F. This copy-on-write operation adds new nodes denoted Q', E', F'. After the copy-on-write operation, nodes E and F are no longer shared, and therefore their reference counts are decremented. New nodes Q', E', F' are transferred to pre-allocated nodes on both controllers, e.g., using RDMA. The following reference modification commands are also transferred, e.g., using RDMA (possibly chained to a previous list if one exists):

add_new_node(Q')
add_new_node(E')
add_new_node(F')
dec_node_ref_cnt(Q)
dec_node_ref_cnt(E)
inc_node_ref_cnt(D)
dec_node_ref_cnt(F)
inc_block_range_ref_cnt(all block ranges shared between F and F')
add_new_block_range(all new block ranges in F')

The mechanism above avoids a potential problem of corrupting a volume by writes to the shared extents in the other. Before the controller parses the reference modification commands and updates the node/extent shared bits, writes to extents shared between F and F' might corrupt the other volume. This cannot happen, however, since before the controller parses the commands, F is still marked as shared and therefore all writes to extents of F will be (perhaps redundantly) copied-on-write. Once the controller parses and atomically commits the commands, the state becomes correct.

In an optional embodiment, back-references are verified for consistency, as part of decreasing the reference counts. A scrub process may also be used to verify the consistency of reference counts and back-references by periodically scanning the volume trees.

Removing an Extent

Removal of an extent typically comprises a non-I/O-path operation, which may be performed by servers 24 or by the controllers 36. An extent may be removed from a thinly-provisioned volume, for example, because of inband SCSI commands (e.g., unmap, trim, extended copy, write same or write using token). An extent may also be removed, modified or split out-of-band due to data reduction (e.g., deduplication or compression).

To remove an extent corresponding to specified UBAs, volume tree 78 is typically traversed downwards from the root, in an attempt to find the leaf corresponding to the UBAs. As described above, nodes are proactively merged on the way down. The extent removal operation, including reference counting, is handled similarly to the extent insertion operation described above.

Storage Data Movement Offload

In some embodiments, the data structures and cloning mechanisms described above can also be used for efficient implementation of data movement operations in system 20. Data movement operations may comprise, for example, VMware vSphere Storage API Array Integration (VAAI) Extended Copy (XCOPY) and write-same commands, Offloaded Data Transfers (ODX), or any other suitable commands.

An XCOPY command, in which all addresses fall within the same mapped volume, can be handled by the issuing server 24 as a single step. The server may modify volume tree 78 such that the target addresses map the same extents as the source, releasing overridden extents in the process. The relevant extents are typically marked as shared, and the relevant reference commands are queued. The XCOPY command may be completed once the updated volume tree is successfully committed to the controller.

An XCOPY command that mixes multiple volumes mapped on the server may be split into two stages performed by the server. In the first stage, all source extents in the source volumes are marked as shared and the relevant reference commands are queued. The source volumes are then committed to storage controller 36. In the second stage, the target volume trees are modified such that the targets map the same extents as the now marked and committed as shared sources.

When using the above mechanism, a write-hole flaw may occur if a server crashes after committing the source volume trees (or part thereof) but before committing the target volume trees. This flaw may be resolved by having the server log its actions onto the storage controllers (e.g., using RDMA), and having the storage controllers perform a cleanup operation in case the server fails without committing the target volumes.

As another example, write-same commands may be handled by the server. In case unmapping is requested (or zeroes are written), extents are removed from the volume map. In case data is written, a single LBA extent is written, with the other LBAs pointing to this shared extent. The above operation should support both the unmap and anchor bits of the write same command.

As yet another example, Offloaded Data Transfers (ODX) can be implemented. ODX uses a token to save the state of data from given LBA ranges. The "populate token" SCSI command is used to create the token, which may then be queried by the "receive ROD token information" command, and used by the "write using token" command to copy data. Since these transactions may span multiple servers, with a token created on one server used by another, the token and its related metadata should be centralized.

Figure 7:
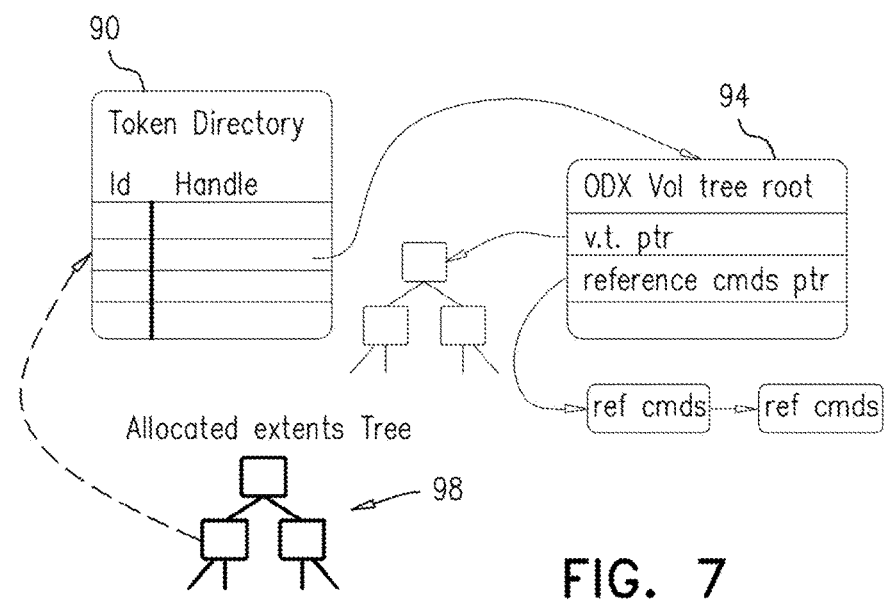
FIG. 7 is a diagram that schematically illustrates data structures used for implementing Offloaded Data Transfers (ODX), in accordance with an embodiment of the present invention.

FIG. 7 is a diagram that schematically illustrates data structures used for implementing ODX, in accordance with an embodiment of the present invention. In this embodiment, an ODX token directory 90 is used for storing tokens. Token directory 90 may be implemented, for example, as a flat table similar to volume directory 74.

The "populate token" command in this implementation marks all source extents as shared and commits the relevant volumes (similarly to XCOPY). The command then creates a new volume tree data structure 94 that maps these extents. An entry is added into an empty slot in the ODX token directory (e.g., using an atomic RDMA test-and-set command) referencing this newly-created volume tree. Reference commands for the extents are added to the root of the volume tree, to be processed by controller 36. The back references from an allocated extents tree 98 hold the token ID and the LBA.

ODX token directory 90, or parts thereof, may be replicated to other servers on demand, and thus can be used to implement the "receive ROD token information" and "write using token" commands without involving the controller CPU. Server crashes may be handled similarly to the volume tree and the XCOPY command.

In-Line and Background Deduplication

In some embodiments, system 20 performs deduplication of data blocks, i.e., identifies duplicate data blocks and makes sure that only one copy is actually stored on storage devices 28. Duplication may be introduced at a higher level, e.g., as part of RAID or other redundant storage of the data blocks, but such redundancy is not regarded herein as duplication of data blocks.

In some embodiments, servers 24 perform the deduplication in-line, as part of the writing process. In other embodiments, storage controllers 36 may run a background process that deduplicates data blocks already stored on storage devices 28. System 20 may combine in-line and background deduplication, thereby exploiting the benefits of each type of deduplication and enhancing the overall deduplication efficiency.

In various embodiments, system 20 may set the amount of deduplication on the in-line and background processes in different ways. The relative amounts of in-line and background deduplication may be set, either constantly or adaptively, based on factors such as I/O latency, I/O throughput (e.g., I/Os per second—IOPS), server CPU utilization, network traffic overhead, desired deduplication ratio, and performance of the underlying storage devices (e.g., SSD endurance and space saving).

In in-line deduplication, when a server 24 sends a data block for storage in storage devices 28, the system first checks whether a data block having the same content is already stored on storage devices 28. If so, the system does not store the block again, but rather updates the shared data structures to point to the existing stored block.

In some embodiments, in-line deduplication is performed by agent 40 in the server that initiates storage of the data block, before sending the block for storage. These embodiments are particularly efficient in terms of network traffic, since the block in question is not sent over the network if it is found to be duplicate. In other embodiments, the server 24 first writes the block to the NVRAM cache, stores it redundantly, acknowledges the write to the requesting application, and only then performs in-line deduplication. In either implementation, servers 24 perform the in-line deduplication, including storage of the data and updating of the shared data structures, using RDMA operations and without executing code on the storage controller CPU.

Figure 8:
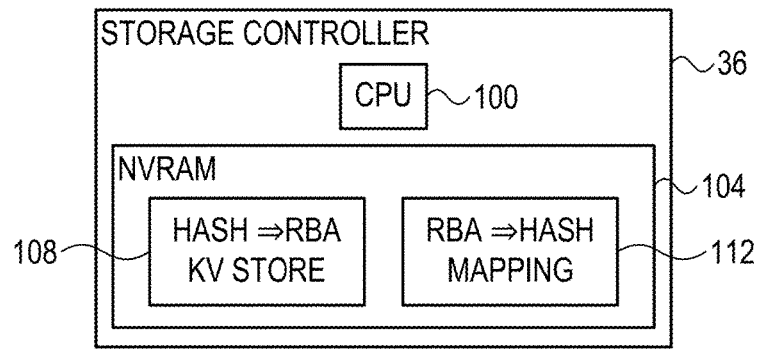
FIG. 8 is a block diagram that schematically illustrates elements of a storage controller, in accordance with an embodiment of the present invention.

FIG. 8 is a block diagram that schematically illustrates elements of storage controller 36, in accordance with an embodiment of the present invention. In this embodiment, storage controller 36 comprises, among other elements, a CPU 100 and an NVRAM 104. NVRAM 104 is accessible to servers 24 directly over network 32 using RDMA.

A shared hash-to-RBA Key-Value (KV) store 108 is stored on NVRAM 104. KV store 108 maps hash values of data blocks to respective RBAs (physical addresses) in which the data blocks are stored. Agents 40 use KV store 108 to identify duplicate data blocks. Any suitable hash function can be used for calculating the hash values of the data blocks. Typically, a strong cryptographic hash function such as SHA-3 is preferred, in order to reduce the probability of hash collision. When the hash function is sufficiently strong, the probability of hash collision becomes negligible, and full read verification becomes unnecessary. If the hash function is not sufficiently strong, it is typically necessary to read the actual data of the block for ensuring an exact match.

KV store 108 is accessible to servers 24 using RDMA. In some embodiments, parts of KV store 108 may be paged-out to storage devices 28, and accessed using RDMA and direct access to the storage devices. Any suitable type of KV store, which is accessible using RDMA, may be used for implementing KV store 108. Several example publications that describe suitable KV stores are cited further below.

In some embodiments, an RBA-to-hash mapping 112 is also stored in NVRAM 104 of storage controller 36. Mapping 112 provides the opposite mapping to KV store 108. In one embodiment, mapping 112 is implemented using another KV store. Alternatively, mapping 112 may be implemented as part of RAID table 56, as part of volume map 60, or as part of other metadata structure. In another embodiment, mapping 112 may reside on storage devices 28 as metadata that is attached to the data blocks being stored (e.g., using NVMe metadata).

Various methods can be used for configuring the shared data structures to point to duplicate data blocks. In one embodiment, pointing to a duplicate block may be performed using a regular extent in volume map 60. Since such duplicates would create small constant-size extents (e.g., 4 KB in size), in some embodiments an optimization for small writes is used to allow for a minimal representation of such constant well-known size extents. Consider, for example, a 1 MB extent in a logical volume, in which one 4 KB block has a reference count higher than one due to deduplication. A write to this 1 MB extent would split the extent such that data will be overwritten except in the duplicate block.

Typically, each agent 40 divides write commands into aligned data blocks (e.g., 4 KB blocks), calculates a hash value for each block, and look-ups the hash values in KV store 108. If a duplicate is found, agent 40 updates volume map 56 to point to the duplicate block, and increments any appropriate reference counters or otherwise marks the target RBA as shared.

To mitigate server or network failures, agents 40 in servers 24 write journals to storage controllers 36 using RDMA. The journals are used by storage controllers 36 to correctly clean-up such failures such that all state remains consistent and correct. In the methods described below, the assumption is that incrementing and decrementing of reference counts ("incref" and "decref" operations) are logged in the journal. Some independent operations described below may be parallelized to reduce latency.

The methods described below refer to a single data block, for the sake of clarity. In some embodiments, the methods are repeated per data block. In other embodiments, actual operations on volume map 56 and the underlying storage devices can be joined together and applied to multiple data blocks together. For example, volume-tree extents may be split or joined, and the largest-size writes possible should be issued.

To ensure that hash-to-RBA KV store 108 is consistent with the actual data on storage devices 28, the hash of a data block and the actual data of the data block are typically written in an interlocked fashion. In some embodiments, interlocking may be achieved using a distributed lock that locks the RBA in question for other writes while performing the write and the KV store update. In other embodiments, interlocking may be implemented in a lockless fashion. A scheme of this sort is also described below.

In some embodiments, agent 40 acknowledges the write after redundantly storing the data in the NVRAM cache, before performing any of the deduplication steps. To preserve consistency between the hash value and the actual data stored, in some embodiments agent 40 performs this operation under a shared lock, e.g., as described in U.S. patent application Ser. No. 14/599,510, cited above. In other embodiments, agent 40 may use a lock-less approach using RDMA atomic operations as shown below, and also addressed in U.S. patent application Ser. No. 15/015,157, cited above.

When applying deduplication, some data blocks are referenced more than once (e.g., an RBA may be referenced by multiple different UBAs). System 20 may use various mechanisms for tracking referenced blocks and releasing unreferenced blocks. In some embodiments, system 20 uses reference counting, i.e., indicates in the shared data structures the number of times each data block is referenced. In other embodiments, system 20 does not employ reference counts, and instead performs a "garbage collection" process in which metadata is traversed on periodically in order to find unreferenced blocks and release them.

Figure 9:
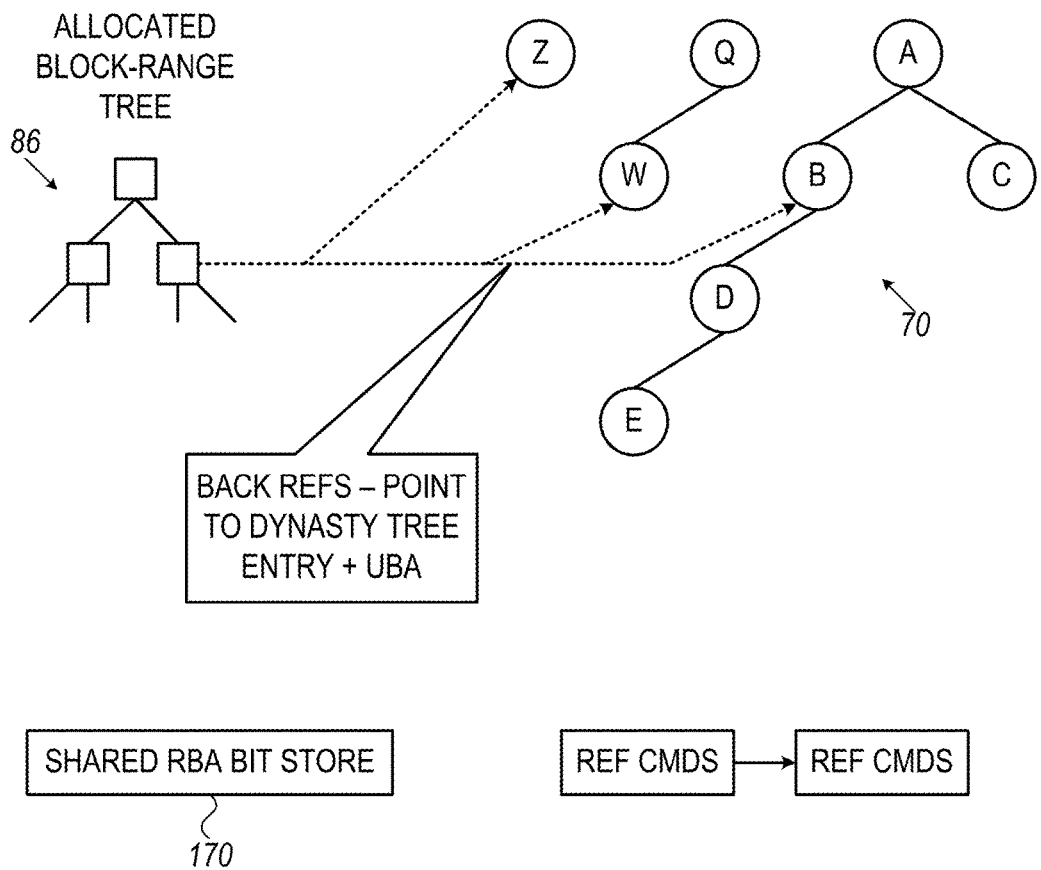
FIG. 9 is a diagram that schematically illustrates data structures used in in-line deduplication, in accordance with an embodiment of the present invention.

FIG. 9 is a diagram that schematically illustrates data structures used in in-line deduplication, in accordance with an embodiment of the present invention. In some embodiments, the shared data structures further comprise a shared RBA bit store 170 (not to be confused with shared bit store 88 of FIG. 4). Shared RBA bit store 170 comprises, for each allocated RBA, a respective bit that indicates whether this RBA is referenced by more than a single UBA or not.

Shared RBA bit store 170 may be implemented, for example, using a bit per RBA, using a hash table comprising all RBAs (or RBA ranges) that are shared, using a shared B-tree, or using any other suitable data structure that can be shared efficiently by servers 24 and storage controllers 36. In an embodiment, shared RBA bit store 170 resides in the storage controller memory and is accessible to servers 24 using RDMA.

In implementations having no deduplication, shared RBA bit store 170 is only written to by storage controllers 36, and read by servers 24. Typically, the system comprises a respective bit store 170 per volume dynasty 70. A local filter, e.g., a Bloom, cuckoo, or other filer, may be used as a local cache before searching the actual remote data structure.

FIG. 9 shows the interaction of the above mechanism with allocated block-range tree 86 and with shared RBA bit store 170. As explained above, allocated block-range tree 86 is a controller-side data structure used for tracking allocated block ranges, their reference counts (number of volume clones sharing a given block range) and back-references into volume dynasty tree 70.

Block Garbage Collection

In some embodiments, system 20 does not indicate reference counts for data blocks, thereby saving the memory and in-line CPU resources required to keep track of such reference counts. Instead, system 20 periodically traverses the metadata in the shared data structures in an attempt to find unreferenced data blocks (e.g., RBAs that are not pointed-to by any UBA) and release them. This process is referred to herein as "garbage collection."

Since duplicate data blocks are not reference-counted in these embodiments, the reference counts in allocated block-range tree 86 and the back-references to dynasty tree 70 become of little value as they are no longer accurate. Nevertheless, it is still useful to retain these structures, because removing them would complicate data movement and defragmentation.

Shared RBA bit store 170 of FIG. 9 continues to be used to facilitate copy-on-write for shared extents and blocks. In these embodiments, in order to support deduplication, the shared bit store is also writable by servers 24, for correctly marking shared blocks across all volume dynasties.

Modification of the shared bit store (e.g., flat bit table or other form of storing a bit per RBA) by servers and storage controllers 36 can be performed, for example, using RDMA atomic Compare And Swap (CAS) operations. A shared bit store implemented using a KV store can reuse the same mechanisms implemented for deduplication. Thus, for example, bits in the shared bit store can be set by storage controllers 36 as volumes are cloned, and by servers 24 as duplicate blocks are mapped to share a previously non-shared block. Storage controllers 36 may also mark blocks as shared during background deduplication, as will be explained below.

In a typical embodiment, storage controllers 36 periodically traverse the various volume maps 60 and mark all referenced blocks. After each such cycle of garbage collection, blocks that are no longer referenced are released. The disclosed garbage collection process can be divided between storage controllers 36, and/or distributed further to servers 24 such that each server scans the volume trees for the volumes it has mapped.

Example Write Processes Including in-Line Deduplication

FIG. 10 is a flow chart that schematically illustrates a write process carried out by agent 40, including in-line deduplication, in accordance with an embodiment of the present invention. The method begins with agent 40 of a certain server 24 receiving a data block for storage, at an input step 120. The data block is received from a certain user or application (e.g., user/application 44 in FIG. 2), and is associated with a certain user volume and has a specified UBA.

At a hash calculation step 124, agent 40 calculates a hash value over the data of the data block. At a KV store lookup step 128 and a duplicate checking step 132, agent 40 queries hash-to-RBA KV store 108 with the calculated hash value, in order to find out whether a data block having the same hash value (and thus presumably the same data) is already stored on storage devices 28.

If the hash value calculated at step 124 matches an existing entry in KV store 108, agent 40 concludes that a duplicate has been found. In such a case, there is no need to store the data block again. Instead, agent 40 marks the RBA that is mapped (in KV store 108) to the hash value as shared, at a shared marking step 136. Agent 40 also updates volume map 60 to map the UBA of the data block (specified at step 120) to that RBA, at a volume-map updating step 140. The method then loops back to step 120 above for handling the next data block to be written.

If, on the other hand, step 132 does not find a match between the hash value of the received data block and any existing entry in KV store 108, agent 40 proceeds to write the data block. At a shared RBA checking step 144, agent 40 checks whether the RBA mapped to the UBA of the data block is already allocated and/or shared.

If the RBA is found and not shared, agent 40 writes the data block to the existing RBA, at an overwriting step 148. The method then loops back to step 120 above. If the RBA is found and shared (or not found at all, i.e., not allocated before), agent 40 allocates a new RBA, at an RBA allocation step 152, and writes the data block to this RBA, at a writing step 156. Agent 40 updates volume map 60 to map the UBA of the data block to the new RBA, at a volume-map updating step 160. The method then loops back to step 120 above.

In an example embodiment, the write process above can be implemented in accordance with the following pseudo-code:

```
write(vol, uba, data)
Foreach block in data:
1.    h = hash(block)
2.    dup_rba = kv_lookup(hash)
3.    (rba, shared_extent) = volume_map_lookup(vol, uba)
4.    if dup_rba:      // Duplicate found
      a.    If dup_rba == rba:
            i.    return // Overwriting the same block with
                  same data
      b.    set_shared(dup_rba)
            /* As    dup_rba    is    now    shared,    if
            kv_lookup(hash) returns the same RBA, it is
            possible to safely dedup to that RBA. Note
            that the second kv_lookup(hash) may be further
            optimized by the kv implementation since the
            same lookup took place only a short while ago.
            */
      c.    cur_dup_rba = kv_lookup(hash)
      d.    if cur_dup_rba != dup_rba:
            /* Racing writes may have removed the hash or
            removed  and  re-added  it  at  a  new  location
            before   dup_rba   has   been   set   as   shared.
            Therefore, need to retry, leaving dup_rba
            shared to avoid races */
            i.    dup_rba = cur_dup_rba
            ii.   goto 4
      e.    volume_map_set(vol, uba, dup_rba)
      f.    return
// Duplicate not found - either overwrite or allocate a
new block and write there
// A shared extent means that the rba is located in an
extent shared by multiple volumes.
5.    if rba found and not shared extent:
a.    shared_by_rba = is_shared_rba(rba)
b.    old_hash = hash_from_rba(rba)
6.    if  rba  found  and  not  shared_by_rba  and  not
shared_by_extent:
/* The RBA is allocated but not shared, and will
therefore be overwritten. Before overwriting, however,
need to take care of races with parallel deduplications
referencing the same RBA, and with races where the RBA is
```

-continued

```
overwritten by some other write and then referenced once
more because of deduplication. */
    a.      journal(kv_del, rba)
    b.      kv_del(old_hash)    //   Prevent   dedup   from
            referencing this hash/RBA
    c.      if set_shared_if_not_shared_return_
            true_if_was_shared(rba)
/* We raced with a dedup to this RBA. Restore the hash in
the kv store. Make sure, however, that the hash and the
actual data match, since a parallel write may have
written new data, which was later deduplicated and caused
the RBA to be shared. */
            i.      interlocked_kv_set_to_hash_from_rba (rba)
            ii.     journal_commit(kv_del, rba)
            iii.    shared_by_rba = true
    d.      else
/* We atomically marked the non-shared RBA as shared to
redirect any parallel writes to the same UBA. Since we
removed RBA's hash from the kv store, this RBA is
guaranteed to be ours only and it should be safe to
unshare it before it is added back to the kv store. */
            i.      interlocked_write_unshare_and_kv_set(rba,
                    data, hash)
            ii.     journal_commit(kv_del, rba)
            iii.    return
7.  if    (rba    not    found)    or    shared_extent    or
shared_by_rba:
// The block is either shared or newly provisioned,
redirect to a new block
    a.      rba = alloc_rba( )
8.  interlocked_write_and_kv_set(rba, data, hash)
9.  if shared_by_rba or shared_by_extent:
    a.      volume_map_set(vol, uba, rba)
set shared (rba)
1.  RDMA read aligned 64 bits containing the shared bit
2.  If shared, return
3.  Atomic RDMA CAS to set the bit
a.  On failure, go back to 1
is shared (rba)
1.  RDMA read shared bit
```

When using the above method, journaling is not needed because all garbage collection is centrally managed by storage controllers 36. The interlocked_write_unshare_and_kv_set operation ensures that the data is written along with its hash, but the hash cannot be found in KV store 108 before the RBA is marked as not shared.

In embodiments in which a write incurs locking an RBA or a range of RBAs, the write procedure may be simplified, because racing writes to the same RBA are locked. In such embodiments, set_shared_if_not_shared_return_true_if_was_shared may be replaced with is_shared_rba( ) and the else block of step 6.d should be removed. set_shared may simply set the shared bit without the need for an atomic operation.

Example Implementation of Shared Block Reference Count

In various embodiments, system 20 may use various data structures and techniques to maintain reference counts of shared data blocks, for use in deduplication. The solution outlined below complements the reference-counting mechanism of extents described above, which is used for space-efficient representation of volume clones. Generally speaking, the extent reference-counting mechanism specifies the number of volumes (e.g., clones or snapshots) that use a certain extent. The data-block reference-counting mechanism, on the other hand, specifies the number of UBAs that are mapped to a certain RBA.

In some embodiments, the extent reference-count mechanism is enhanced to support aligned block-level deduplication. Reusing the extent reference-count mechanism for aligned block-level deduplication presents several challenges. First, the reference-counting mechanism in the original volume map data structure is implemented per volume dynasty, since the only way to share data is by cloning volumes. For example, only a single back reference per RAID block range is defined in the allocated block range tree, which points to the volume dynasty tree. Second, the extent reference-counting mechanism is extent based, which is memory-inefficient for a large quantity of known-size blocks.

Thus, in some embodiments, the extent reference-counting mechanism is extended to store global reference counts and multiple back-references pointing to all the referencing dynasty tree nodes. This extension is illustrated in FIG. 9 above. In some embodiments, such a data structure may still be manipulated exclusively by controllers 36, with the help of reference commands from servers 24. Reference commands from servers 24 are queued for controller 36 for each required reference change. Shared RBA bit store 170 is updated by servers 24 themselves, and by controllers 36, similarly to the update scheme described above. Servers 24 may only make a block or a range of blocks shared. Marking blocks as non-shared, as well as releasing blocks, may only be done by controller 36 once the controller ascertains the blocks are indeed unreferenced.

As mentioned above, in some embodiments, extents and block ranges of a well-known size (e.g., 4 KB) may be optimized to consume less memory, for example by removing the range size field.

In the latter embodiment, the write process can be implemented in accordance with the following pseudo-code:

```
write(vol, uba, data)
Foreach block in data:
1.  h = hash(block)
2.  dup_rba = kv_lookup(hash)
3.  (rba, shared_extent) = volume_map_lookup(vol, uba)
4.  if dup_rba:             // Duplicate found
    a.      If dup_rba == rba:
            i.      return    //   Overwriting   the   same   block   with
                    same data
    b.      journaled_incref(dup_rba)
/* As dup_rba is now shared, if kv_lookup(hash) returns
the same RBA, we can safely dedup to that RBA. Note that
the second kv_lookup(hash) may be further optimized by
the kv implementation since the same lookup took place a
jiffy before. */
    c.      cur_dup_rba = kv_lookup(hash)
    d.      if cur_dup_rba != dup_rba:
/* Racing writes may have removed the hash, or removed
and re-added it at a new location before dup_rba has been
set as shared. Therefore, need to retry, leaving dup_rba
shared to avoid races. Nevertheless, the controller still
decreases the reference count. */
            i.      journaled_decref(dup_rba)
            ii.     dup_rba = cur_dup_rba
            iii.    goto 4
    e.      journaled_volume_map_set(vol, uba, dup_rba)
// Commit the incref and the volume map set
    f.      journal_commit(incref, dup_rba; volume_map_set,
            vol, uba, dup_rba)
    g.      return
// Duplicate not found - either overwrite or allocate a
new block and write there
// A shared extent means that the rba is located in an
extent shared by multiple volumes.
5.  if rba found and not shared_extent:
    a.      shared_by_rba = is_shared_rba(rba)
    b.      old_hash = hash_from_rba(rba)
6.  if    rba    found    and    not    shared_by_rba    and    not
shared_by_extent:
/* The RBA is allocated but not shared, and will
```

```
therefore be overwritten. Before overwriting, races with
parallel deduplications referencing the same RBA should
be handled, as well as races in which the RBA is
overwritten by another write and then referenced once
more because of deduplication. */
    a.    journal(kv_del, rba)
    b.    kv_del(old_hash)          // Prevent dedup from
          referencing this hash/RBA
    c.    if     journaled_incref_if_not_shared_return_
          true_if_was_shared(rba)
/* We raced with a dedup to this RBA. Restore the hash in
the kv store, but make sure that the hash and the actual
data match as a parallel write may have written new data,
which later got deduplicated and caused the RBA to be
shared. */
          i.    interlocked_kv_set_to_hash_from_rba (rba)
          ii.   journal_commit(kv_del, rba)
          iii.  shared_by_rba = true
    d.    else
/* We atomically marked the non-shared RBA as shared to
redirect any parallel writes to the same UBA. Since we
removed the RBA hash from the kv store, this RBA is
guaranteed to be ours only and it should be safe to
unshare it before it is added back to the kv store. */
          i.    interlocked_write_unshare_decref_and_kv_set
                (rba, data, hash)
          ii.   journal_commit(kv_del,   rba,   incref,
                decref)
          iii.  return
7.  if (rba not found) or shared_extent or shared_by_rba
// The block is either shared or newly provisioned,
redirect to a new block
    a.    rba = alloc_rba( )
8.  interlocked_write_and_kv_set(rba, data, hash)
9.  if shared_by_rba or new_block:
    a.    old_rba = volume_map_set(vol, uba, rba)
10. if shared_by_rba and old_rba == rba:
/* At the time of checking, this RBA was shared. We'd
like to decrement its reference counter, but must account
for the case that our own UBA is written in parallel and
we get to this line on two (or more) hosts in parallel.
Since the RBA was shared, a new RBA was allocated. The
volume_map_set operation returns the previous RBA for
this UBA, and hence only one of the hosts decrements the
RBA reference count. Consider also a race where two
writers race to write to the same RBA (from different
volumes) where ref_cnt(RBA)=2. In such a case the
reference count will drop to zero and depending on the
embodiment, either the host or the garbage collecting
controller should remove its hash from the kv store and
return the RBA to the free block pool.*/
    a.    journaled_decref(rba)
```

The interlocked_write_unshare_decref_and_kv_set operation ensures that the data is written along with its hash, but the hash cannot be found in the kv store before the RBA is marked as not shared. Journaling the reference count operations is required to assist controllers 36 in handling server failures. To preserve atomicity, the journal entries are written to the same buffer (queue) as the reference commands themselves.

journaled incref(rba)
1. RDMA read aligned 64 bits containing the shared bit
2. If not shared:
   a. Atomic RDMA CAS to set the bit
      i. On failure, go back to 1
3. Queue incref(rba) cmd to the controllers (only applied when incref_commit(rba) is also queued—which is queued when the incref is committed)

journaled decref(rba)
1. Queue decref(rba) cmd to the controllers (again, applied when decref_commit(rba) is also queued)

is shared (rba)
1. RDMA read shared bit

In embodiments in which a write incurs locking an RBA or a range of RBAs, the write procedure may be simplified as racing writes to the same RBA are locked. In such embodiments, journaled_incref_if_not_shared_return_true_if_was_shared may be replaced with is_shared_rba( ) and the else block of step 6.d should be removed. Steps 9 and 10 no longer need to handle a racing write to the same UBA. journaled_incref may simply set the shared bit without the need for an atomic operation.

An alternative solution to reference counting for deduplication could be storing a reference count per RBA. However, doing so is inefficient as the amount of RBAs having a reference count of two or higher is expected to be relatively small, especially if volume cloning and storage data movement (e.g., VAAI, ODX) are used correctly by the attached servers.

In other embodiments, however, deduplicated RAID block reference counters may be stored in a key-value store managed by controller 36, where RBA is used as the key and the reference count is the value. The reference count entries are added, incremented and decremented by controllers 36 using atomic RDMA operations (see the key-value store implementation below for more details). RBAs are added to the key-value store when their reference count should be two or higher, and removed when their reference count drops below two.

Controller-Side Deduplication Optimization

In some embodiments, the lookup process of hash-to-RBA KV store 108 (FIG. 8) may be optimized for in-line deduplication, to further reduce latency and read amplification on the storage devices. This optimization may come at the expense of reduced deduplication opportunity, i.e., at the expense of retaining some duplicate data blocks on the storage devices.

In an example embodiment, if a portion of KV store 108 is paged-out to storage devices 28, servers 24 may look-up only the in-memory portion of the KV store that was not paged-out. In another example embodiment, the number of network roundtrips allowed for hash lookup in KV store 108 can be limited to some maximal number. Such optimizations may add redundant hash values to the in-memory portion of KV store 108, which may later be used by storage controllers 36 to find duplicate data blocks as the KV store ages and is compacted to the storage devices. Data need not be reread to find such duplicates, since the relevant hash values are already available.

Disabling and Enabling Deduplication Per Logical Volume

Deduplication is highly effective in some types of workloads, for example virtualization and workloads that share production and test environments on a single storage controller. In other types of workloads, deduplication may be detrimental to performance and power consumption while providing little or no benefit. Thus, in some embodiments system 20 applies the disclosed deduplication techniques selectively, only for selected volumes, groups of volumes or types of volumes.

In an example embodiment, deduplication may be disabled per volume or per volume dynasty. Additionally or alternatively, deduplication may be enabled at run-time.

Even after disabling deduplication, for a volume that previously had deduplication enabled, servers 24 should keep executing the part of the write process dealing with overwrites, since blocks in the volume may be shared. In some embodiments, storage controller 36 runs a background process that traverses the data blocks in such volume(s) and creates copies of shared blocks, thus practically disabling deduplication and allowing all mapping servers to start using a non-deduplication-aware write process.

Enabling deduplication for a volume at run-time can be carried out by simply starting to use the deduplication-aware write process (e.g., the process of FIG. 10). In some embodiments, in parallel, a background process may process existing blocks, so to deduplicate existing data and populate the hash table. This background process may run on controllers 36, or distributed to servers 24, or both. Interlocked operations are needed in this use-case as well, to ensure the consistency between hash-to-RBA KV store 108 and the actual data. Care should be taken not to cause copy-on-write for extents that are marked as shared (volume clones).

In some embodiments the hash table may be populated lazily by servers 24 when reading data blocks. This scheme also requires the hash update and the readout to be interlocked to ensure consistency.

Shared KV Store Design Considerations

In various embodiments, hash-to-RBA KV store 108 can be implemented in different ways. For example, a KV store called PILAF is described by Mitchell et al., in "Using one-sided RDMA reads to build a fast, CPU-efficient key-value store," Proceedings of the 2013 USENIX Annual Technical Conference, June, 2013, pages 103-114, which is incorporated herein by reference. PILAF uses one-sided RDMA reads to implement get operations, while put operations do trigger the controller CPU. Since the vast majority of operations on KV store 108 are read operations, PILAF or a similar solution is a suitable choice.

Another suitable example KV store, called Falafel, is described by Behringer et al., in "Memory Management for Concurrent RDMA: A Design for a Key-Value Store," Karlsruhe Institute of Technology, June, 2014, which is incorporated herein by reference. The Falafel KV store utilizes RDMA reads, writes and atomic operations to further offload the target CPU, at the expense of a larger number of network roundtrips and atomic operations.

In some embodiments it may be prohibitive to store the entire KV store 108 in memory 104 of storage controller 36. In such embodiments, storage controllers 36 may periodically merge and move entries to increasingly more memory-efficient data structures, holding the bulk of the data on storage devices 28. A KV design of this kind, called SILT, is described by Lim et al., in "SILT: a memory-efficient, high-performance key-value store," Proceedings of the Twenty-Third ACM Symposium on Operating Systems Principles, October, 2011, pages 1-13, which is incorporated herein by reference. In-memory filters for the static high-order KV stores may be cached on servers 24 to reduce latency for get misses. The static KV stores in SILT may be accessed remotely through a combination of RDMA reads, and reads from the storage devices.

Further alternatively, any other suitable KV store design can be used. Some KV store designs are less suitable for implementing KV store 108. For example, a KV store called HERD is described by Anuj et al., in "Using RDMA efficiently for key-value services," Proceedings of the 2014 ACM conference on SIGCOMM, August, 2014, pages 295-306, which is incorporated herein by reference. HERD is a less attractive choice, because it triggers the controller CPU on both read and write operations.

As noted above, the KV store 108 should be kept consistent with the actual data. In some embodiments, a lock-based solution (e.g., as described in U.S. patent application Ser. No. 14/599,510, cited above) can utilize a shared lock to update both the KV store and the data in an interlocked fashion.

Alternatively, a lock-less mechanism (e.g., as described in U.S. patent application Ser. No. 15/015,157, cited above) can be used for this purpose. In the example KV store designs cited above, collisions between hash values of different keys are typically mitigated by storing the key alongside the value, to ensure that the correct value is returned. In some embodiment, it is possible to omit this safeguard and allow the KV store to return multiple hash values, with zero or one of the values being actually correct. The correct key (hash value) can then be found by looking-up RBA-to-hash mapping 112 (FIG. 8) with each returned hash value.

In U.S. patent application Ser. No. 15/015,157, cited above, hash values are added to the data structures as follows. All write operations operate on both data and hash(data). Each NVRAM cache page is augmented with space for storing the relevant hash, thus creating a lockless and atomic binding between cached data and its hash.

In some embodiments, destaging such NVRAM cache pages and their hashes may be implemented by using custom-size block sizes (e.g., 4128 bytes) to store both data and hash in a single block that is atomically written and read. In embodiments where the storage devices support storing metadata alongside each block (as in NVMe, for example), the hashes may be stored in such metadata, provided that it is guaranteed that the data and its hash are always written together atomically.

In other embodiments, the hashes may be destaged into a RAID Stripe Descriptor Table (RSDT) such that the hashes of blocks in a stripe are all stored together in its RAID Stripe Descriptor (RSD). Since destaging a block is an atomic operation, it is guaranteed that a block and its hash are always written atomically together. This approach may require an extra roundtrip to read the hash if the RSDT is partially paged-out to the storage devices.

Using the mechanisms above, finding a hash in hash-to-RBA KV store 108 becomes finding all the possible RBAs that the hash may be located in, and then reading all the matching hashes to find the correct RBA. If an in-memory linear hash is used (as in the Falafel KV store) for the first level, then a hash that exists in the first level can be found using two roundtrips—One roundtrip to RDMA-read the table of possible RBAs, and a second roundtrip to read the matching hashes. The in-memory filter for the other levels of the KV store can be also read in the first roundtrip.

Offloading of Hash Calculation to RDMA-Capable NIC

In some embodiments, servers 24, storage controllers 36, storage devices 28 and/or NVRAM cache 46 (referred to collectively as "system nodes") connect to network 32 using RDMA-capable Network Interface Controllers (NICs), sometimes referred to as RNICs. In some embodiments, the computational tasks of calculating hash values over data blocks may be performed by one or more of these NICs, thereby offloading the CPUs of the system nodes. In some embodiments the NICs comprise hardware or firmware that performs these tasks. In other embodiments, a processor in the NIC runs software emulation that performs these tasks.

In an example embodiment, the system nodes support an "RDMA Write Hash" command that calculates a hash function (e.g., SHA-1) on the local RNIC and writes it to a remote buffer, thereby offloading the hash calculation to the RNIC. In another example embodiment, the system nodes support an "RDMA Read Hash" command that calculates a hash function (e.g., SHA-1) of a data block stored in a remote buffer. This command is typically implemented by having the remote RNIC read the buffer, calculate its hash and send it to the local RNIC, to be written into a pre-allocated user buffer.

Although the embodiments described herein mainly address offloading of host CPUs and storage controller CPUs, the methods and systems described herein can also be used in other applications, such as in other offloading applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
   in a system that comprises multiple servers, multiple multi-queue storage devices and at least one storage controller that communicate over a network, running one or more user applications on a given server among the servers, and storing data blocks, which comprise data produced by the user applications running on the given server, by the given server on the storage devices;
   maintaining a shared data structure, which is accessible to the servers using remote direct memory access and which maps hash values calculated over the data blocks to respective storage locations of the data blocks on the storage devices, wherein any hash value found in the shared data structure indicates that a data block that matches the hash value exists in at least one logical volume mapped by at least one of the multiple servers in the system; and
   deduplicating, by the given server, the data blocks that comprise the data produced by the user applications running on the given server, by:
      looking-up the shared data structure by the given server without executing code on a processor of the storage controller; and
      storing in the storage devices only the data blocks that do not exist in any logical volume used by any of the multiple servers in the system, and therefore have no matching hash values in the shared data structure.

2. The method according to claim 1, wherein the shared data structure comprises a Key-Value (KV) store.

3. The method according to claim 1, wherein deduplicating the data blocks comprises, when the given server prepares to store a given data block, checking whether the hash value of the given data block already exists in the shared data structure, and if the hash value of the given data block exists, refraining from storing the given data block on the storage devices.

4. The method according to claim 3, wherein deduplicating the data blocks further comprises, if the hash value of the given data block exists, mapping a logical address of the given data block to a storage location to which the hash value of the given data block is mapped in the shared data structure.

5. The method according to claim 3, wherein deduplicating the data blocks further comprises, if the hash value of the given data block exists, updating a shared reference count associated with the hash value of the given data block.

6. The method according to claim 3, wherein deduplicating the data blocks further comprises, if the hash value of the given data block exists, updating a shared bit store to indicate that the given data block is referenced more than once.

7. The method according to claim 1, wherein deduplicating the data blocks further comprises running a background garbage-collection process that identifies and releases unreferenced data blocks.

8. The method according to claim 1, further comprising running by the storage controller a background deduplication process that deduplicates data blocks already stored on the storage devices, wherein deduplication operations performed by the background deduplication process are seen atomically by the servers.

9. The method according to claim 1, wherein deduplicating the data blocks comprises choosing whether or not to deduplicate a given data block, depending on a logical volume to which the given data block belongs.

10. The method according to claim 1, wherein deduplicating the data blocks comprises calculating the hash values by one or more Network Interface Controllers (NICs) of the servers, the storage devices or the storage controller.

11. A system for data storage, comprising:
    at least one storage controller; and
    multiple servers, which are configured to communicate over a network with the storage controller and with multiple multi-queue storage devices,
    wherein a given server among the servers is configured to:
       run one or more user applications;
       store data blocks, which comprise data produced by the user applications running on the given server, on the storage devices;
       access, using remote direct memory access, a shared data structure that maps hash values calculated over the data blocks to respective storage locations of the data blocks on the storage devices, wherein any hash value found in the shared data structure indicates that a data block that matches the hash value exists in at least one logical volume mapped by at least one of the multiple servers in the system; and
       deduplicate the data blocks that comprise the data produced by the user applications running on the given server, by:
          looking-up the shared data structure without executing code on a processor of the storage controller; and
          storing in the storage devices only the data blocks that do not exist in any logical volume used by any of the multiple servers in the system, and therefore have no matching hash values in the shared data structure.

12. The system according to claim 11, wherein the shared data structure comprises a Key-Value (KV) store.

13. The system according to claim 11, wherein the given server is configured to deduplicate the data blocks by, upon preparing to store a given data block, checking whether a hash value of the given data block already exists in the shared data structure, and if the hash value of the given data block exists, refraining from storing the given data block on the storage devices.

14. The system according to claim 13, wherein the given server is further configured, if the hash value of the given data block exists, to map a logical address of the given data block to a storage location to which the hash value of the given data block is mapped in the shared data structure.

15. The system according to claim 13, wherein the given server is further configured, if the hash value of the given data block exists, to update a shared reference count associated with the hash value of the given data block.

16. The system according to claim 13, wherein the given server is further configured, if the hash value of the given data block exists, to update a shared bit store to indicate that the given data block is referenced more than once.

17. The system according to claim 11, wherein the storage controller is configured to run a background garbage-collection process that identifies and releases unreferenced data blocks.

18. The system according to claim 11, wherein the storage controller is configured to run a background deduplication process that deduplicates data blocks already stored on the storage devices, wherein deduplication operations performed by the background deduplication process are seen atomically by the servers.

19. The system according to claim 11, wherein the servers are configured to choose whether or not to deduplicate a given data block, depending on a logical volume to which the given data block belongs.

20. The system according to claim 11, wherein one or more of: the storage controller and one or more of the servers comprise one or more Network Interface Controllers (NICs), which are configured to communicate over the network and also to calculate the hash values.

21. A server, comprising:
a Network Interface Controller (NIC) configured to connect to a network; and
a processor, which is configured to:
  run one or more user applications;
  communicate over the network with at least one storage controller and with multiple multi-queue storage devices;
  store data blocks, which comprise data produced by the user applications running on the server, on the storage devices;
  access, using remote direct memory access, a shared data structure that maps hash values calculated over the data blocks to respective storage locations of the data blocks on the storage devices, wherein any hash value found in the shared data structure indicates that a data block that matches the hash value exists in at least one logical volume mapped by at least one of the multiple servers in the system; and
  deduplicate the data blocks that comprise the data produced by the user applications running on the server, by:
    looking-up the shared data structure without executing code on any processor of the storage controller; and
    storing in the storage devices only the data blocks that do not exist in any logical volume used by any of the multiple servers in the system, and therefore have no matching hash values in the shared data structure.

22. The server according to claim 21, wherein the processor is configured, upon preparing to store a given data block, to check whether a hash value of the given data block already exists in the shared data structure, and if the hash value exists, to refrain from storing the given data block on the storage devices.

* * * * *